(12) United States Patent
Nakanishi

(10) Patent No.: US 8,013,959 B2
(45) Date of Patent: Sep. 6, 2011

(54) LIQUID CRYSTAL DISPLAY DEVICE HAVING NUCLEUS GENERATION SECTION

(75) Inventor: Youhei Nakanishi, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 323 days.

(21) Appl. No.: 12/377,195

(22) PCT Filed: Jun. 11, 2007

(86) PCT No.: PCT/JP2007/061693
§ 371 (c)(1),
(2), (4) Date: Feb. 11, 2009

(87) PCT Pub. No.: WO2008/029547
PCT Pub. Date: Mar. 13, 2008

(65) Prior Publication Data
US 2010/0177268 A1    Jul. 15, 2010

(30) Foreign Application Priority Data

Sep. 4, 2006   (JP) ................................. 2006-239555

(51) Int. Cl.
*G02F 1/1335* (2006.01)
*G02F 1/1337* (2006.01)
(52) U.S. Cl. .......................... 349/114; 349/123; 349/124
(58) Field of Classification Search .................. 349/114, 349/123, 124
See application file for complete search history.

(56) References Cited

U.S. PATENT DOCUMENTS

| | | |
|---|---|---|
| 2002/0105613 A1 | 8/2002 | Yamakita et al. |
| 2002/0145579 A1 | 10/2002 | Yamakita et al. |
| 2002/0149551 A1 | 10/2002 | Yamakita et al. |
| 2002/0171792 A1 | 11/2002 | Kubota et al. |
| 2003/0122767 A1 | 7/2003 | Nakao et al. |
| 2003/0123004 A1 | 7/2003 | Fujii et al. |
| 2004/0145691 A1 | 7/2004 | Kubota et al. |
| 2004/0150759 A1 | 8/2004 | Nishino et al. |
| 2006/0066790 A1 | 3/2006 | Tanaka et al. |
| 2007/0236629 A1* | 10/2007 | Wu et al. ..................... 349/96 |

(Continued)

FOREIGN PATENT DOCUMENTS

CN        1395136 A       2/2003

(Continued)

OTHER PUBLICATIONS

International Search Report for PCT/JP2007/061693, mailed Jul. 17, 2007.

*Primary Examiner* — Mike Qi
(74) *Attorney, Agent, or Firm* — Nixon & Vanderhye P.C.

(57) ABSTRACT

An object of the present invention is to provide a transflective type LCD device in which each of a transmissive area and a reflective area can be driven in an OCB mode, and it is possible to prevent lowering of transmittance and reflectance, and to prevent a pixel from darkening in a case where each of the transmissive area and the reflective area is driven in an OCB mode. The liquid crystal display device of the present invention includes, in each pixel (11), a single nucleus generation section for generating a bend nucleus for promoting a transition of liquid crystal molecules of the liquid crystal layer into a bend alignment. Application of a voltage to the liquid crystal molecules of the liquid crystal layer in the transmissive area and the reflective area carries out a transition from a spray alignment into a bend alignment in response to an applied voltage.

18 Claims, 21 Drawing Sheets

U.S. PATENT DOCUMENTS

2008/0100784 A1* 5/2008 Haruyama .................. 349/114
2008/0204638 A1* 8/2008 Sawado ..................... 349/114

FOREIGN PATENT DOCUMENTS

| | | |
|---|---|---|
| CN | 1519619 | 8/2004 |
| CN | 1755461 | 4/2006 |
| EP | 1 124 153 | 8/2001 |
| JP | 2002-350902 | 12/2002 |
| JP | 2005-31680 | 2/2005 |
| JP | 2005-084593 | 3/2005 |
| JP | 2006-113259 | 4/2006 |
| JP | 2007-058019 | 3/2007 |
| JP | 2007-133193 | 5/2007 |
| JP | 2007133193 A * | 5/2007 |

* cited by examiner

LIQUID CRYSTAL DISPLAY DEVICE HAVING NUCLEUS GENERATION SECTION

This application is the U.S. national phase of International Application No. PCT/JP2007/061693, filed 11 Jun. 2007, which designated the U.S. and claims priority to Japanese Patent Application No. 2006-239555, filed 4 Sep. 2006, the entire contents of each of which are hereby incorporated by reference.

TECHNICAL FIELD

The present invention relates to a liquid crystal display device, especially, to a transflective type LCD device using an OCB mode (Optically Self-Compensated Birefringence mode).

BACKGROUND ART

A liquid crystal display device has been conventionally used in various kinds of electronic apparatuses such as a television, a notebook computer (personal computer), a desktop personal computer, a PDA (Personal Digital Assistant) and a portable phone. This is because the liquid crystal display device (i) is thinner and lighter than a CRT (Cathode Ray Tube) and (ii) can be driven with a lower operation voltage so as to have low power consumption.

A transflective type LCD device among liquid crystal display devices has two display modes, i.e., a transmission mode and a reflection mode, and can turn off a backlight in accordance with brightness of its surrounding environment. This allows a reduction in power consumption. Therefore, a transflective type LCD device is suitable for a personal digital assistant such as a portable phone.

On the other hand, it is increasingly becoming popular to display a moving image on a liquid crystal panel such as a liquid crystal television. This necessitates an increase in response speed of the liquid crystal panel so that the moving image can be displayed well. In view of the circumstances, it is an OCB mode (Optically Self-Compensated Birefringence mode) having high-speed response that has been recently attracting attention. In this OCB mode, a liquid crystal layer is sandwiched between two substrates. Each of the substrates is subjected to an alignment process which causes liquid crystal molecules to be aligned in parallel to each other and in the same direction. A wave plate is provided on a surface of each of the two substrates. A polarizing plate is further provided on each of the two substrates so that a crossed Nicols state is realized. A negative wave plate whose main axis is hybrid-aligned is used as the wave plate.

FIGS. 28 and 29 are cross-sectional views each schematically illustrating an arrangement of a conventional liquid crystal display device 101 using an OCB mode, FIG. 28 shows a state obtained in a case where no voltage is applied, and FIG. 29 shows a state obtained in a case where a voltage is applied.

As shown in FIGS. 28 and 29, a liquid crystal panel 105 in the liquid crystal display device 101 has an arrangement in which (i) a color filter substrate 141 in which a first transparent electrode 156 and a color filter (not shown) are formed on a first glass substrate 152 and (ii) a TFT substrate 142 in which a TFT (Thin Film Transistor) 133, a wiring layer (not shown), an insulating layer 126, and a second transparent electrode 122 are formed on a second glass substrate 151 are included, and in which a liquid crystal layer 155 including liquid crystal molecules 190 is sandwiched between the color filter substrate 141 and the TFT substrate 142.

As shown in FIGS. 28 and 29, according to the liquid crystal display device 101 using the OCB mode, the liquid crystal molecules 190 has a spray alignment when no voltage is applied (see FIG. 28), and the spray alignment is shifted to a bend alignment when a voltage is applied (see FIG. 29). An image is displayed during the bend alignment.

Patent Document 1 discloses a technique in which the OCB mode is applied to a transflective type LCD device.

FIG. 30 is a cross-sectional view schematically illustrating an arrangement of a liquid crystal display device of the Patent Document 1.

As shown in FIG. 30, according to the liquid crystal display device of the Patent Document 1, the liquid crystal molecules 190 in each of reflective areas a (g area in FIG. 30) are aligned like a half of the liquid crystal molecules 190 in a transmissive area b (f-area in FIG. 30). That is, the liquid crystal molecules 190 in each of the reflective areas a are vertically aligned at one end, and are horizontally aligned at the other end.

A step resin layer 154 on which a reflective electrode 123 is provided is formed in each of the reflective areas a of the TFT substrate 142. The step resin layer 154 causes a liquid crystal layer, which contributes to transmissive display, to become approximately two times thicker than a liquid crystal layer which contributes to reflective display, thereby resulting in that a light path length in the transmissive area is the same as that in the reflective area.

[Patent Document 1]
Japanese Unexamined Patent Application Publication Tokukai No. 2005-84593 (published on Mar. 31, 2005)
[Patent Document 2]
Japanese Unexamined Patent Application Publication Tokukai No. 2002-207206 (published on Jul. 26, 2002)
[Patent Document 3]
Japanese Unexamined Patent Application Publication Tokukai No. 2002-350902 (published on Dec. 4, 2002)
[Patent Document 4]
Japanese Unexamined Patent Application Publication Tokukai No. 2005-31680 (published on Feb. 3, 2005)
[Patent Document 5]
Japanese Patent No. 3334714 (published on Oct. 15, 2002)

DISCLOSURE OF INVENTION

However, in the technique disclosed in the Patent Document 1, it is necessary to realize a vertical alignment and a horizontal alignment in a minute area, and therefore it is difficult to apply this technique to a product.

Therefore, it is desired that a liquid crystal display device be arranged such that each of a transmissive area and a reflective area is driven in an OCB mode.

Here, it is necessary to carry out a transition to the bend alignment in order to realize the OCB mode. The transition to the bend alignment can be effectively realized with use of a technique for generating a nucleus of the alignment transition.

The following techniques have been proposed as the nucleus generation technique. For example, Patent Document 2 discloses a technique for generating a lateral electric field between a signal line and a pixel electrode, Patent Document 3 discloses a technique for forming a wiring electrode between pixel electrodes in order to strengthen a lateral electric field, Patent Document 4 discloses a technique for forming a metal electrode in order to generate a bend alignment within a pixel, and Patent Document 5 discloses a technique for forming cutout parts on a pixel electrode in order to generate a lateral electric field.

FIGS. 31 and 32 are views each showing how each of a transmissive area and a reflective area is driven in an OCB mode in a liquid crystal display device, in a case where the technique for forming cutout parts (slits) in a pixel electrode is applied to a transflective type LCD device as the nucleus generation technique. FIG. 31 is a plan view schematically illustrating one pixel of a TFT substrate in a liquid crystal display device in which the technique for forming cutout parts (slits) in a pixel electrode is applied to the transflective type LCD device. Further, FIG. 32 is a cross-sectional view, taken on line K-K of FIG. 31, schematically illustrating an arrangement of a liquid crystal panel of the liquid crystal display device, in which the technique for forming cutout parts (slits) in a pixel electrode is applied to the transflective type LCD device. FIG. 32 shows a cross-sectional arrangement of the liquid crystal panel and an alignment state of liquid crystal molecules. Constituents which have similar functions to those explained in FIGS. 28 through 30 are given identical reference numerals, and are not explained repeatedly.

The liquid crystal display device shown in FIGS. 31 and 32 is arranged such that slits 112a are provided as nucleus generation sections at (i) the reflective electrode 123 in the reflective area a and (ii) the second transparent electrode 122 in the transmissive area b, respectively. Below the slits 112a, common electrodes 124 are formed, as auxiliary capacity electrodes, respectively, on the second glass electrode 151 via the insulating layer 126 so as to be parallel to a gate bus line 131. In the liquid crystal display device shown in FIGS. 31 and 32, a pixel electrode 121 is comprised of a reflective electrode 123 and a second transparent electrode 122.

With the arrangement, lateral electric fields are generated in the vicinity of the slits 112a as shown by the equipotential lines x in FIG. 32, respectively. This causes nuclei for the bend alignments to be formed. The gate bus line 131 and a data bus line 132 are connected to the TFT 133 whose drain electrode 133d is connected to the pixel electrode 121 via a contact hole 115.

FIGS. 33 and 34 are views each showing how each of a transmissive area and a reflective area is driven in an OCB mode in a liquid crystal display device, in a case where the technique for forming projections on a pixel electrode is applied to a transflective type LCD device as the nucleus generation technique.

FIG. 33 is a plan view schematically illustrating one pixel of a TFT substrate in a liquid crystal display device in which the technique for forming projections on a pixel electrode is applied to the transflective type LCD device.

Further, FIG. 34 is a cross-sectional view, taken on line L-L of FIG. 33, schematically illustrating an arrangement of a liquid crystal panel of the liquid crystal display device, in which the technique for forming projections on a pixel electrode is applied to the transflective type LCD device. FIG. 34 shows a cross-sectional arrangement of the liquid crystal panel and an alignment state of liquid crystal molecules. Constituents which have similar functions to those explained in FIGS. 28 through 32 are given identical reference numerals, and are not explained repeatedly.

The liquid crystal display device shown in FIGS. 33 and 34 is arranged such that projections 112b are provided, as nucleus generation sections, on (i) the reflective electrode 123 in the reflective area a and (ii) the second transparent electrode 122 in the transmissive area b, respectively.

Also in the liquid crystal display device shown in FIGS. 33 and 34, a pixel electrode 121 is comprised of a reflective electrode 123 and a second transparent electrode 122.

With the arrangement, a nucleus for a bend alignment is formed in the vicinity of the projections 112b. The gate bus line 131 and the data bus line 132 are connected to the TFT 133 whose drain electrode 133d is connected to the pixel electrode 121 via the contact hole 115.

However, in a case where the slits 112a are formed as the nucleus generation sections, respectively, as described above, the liquid crystal molecules cannot be driven above the slits 112a. This causes deterioration in transmittance and reflectance. It was found that the whole pixel becomes dark, in a case where the slits 112a were formed in the transmissive area b and the reflective area a, respectively, in order that each of the transmissive area b and the reflective area a is driven in an CCB mode in the transflective type LCD device.

Further, in a case where, as described above, the projections 112b are formed as the nucleus generation sections, respectively, the liquid crystal layer has substantially a reduced thickness above the projections 112b. This causes deterioration in transmittance and reflectance. It was found that the whole image becomes dark, in a case where the projections 112b were formed in the transmissive area b and the reflective area a, respectively, in order that each of the transmissive area b and the reflective area a is driven in an OCB mode in the transflective type LCD device.

The present invention is attained in view of the above problems. An object of the present invention is to provide (i) a transflective type LCD device in which each of a transmissive area and a reflective area is driven in an OCB mode, and (ii) a transflective type LCD device which can prevent lowering of transmittance and reflectance and can prevent a pixel from darkening, in a case where each of a transmissive area and a reflective area is driven in an OCB mode.

In order to solve the above problems, a liquid crystal display device of the present invention includes: a liquid crystal display element including a pair of opposing substrates, and a liquid crystal layer held by the pair of substrates, each pixel including a transmissive area and a reflective area, the liquid crystal layer being thinner in the reflective area than in the transmissive area, only a single nucleus generation section for generating a bend nucleus being provided in said each pixel, the bend nucleus promoting a transition of liquid crystal molecules of the liquid crystal layer into a bend alignment; and application of a voltage to the liquid crystal molecules of the liquid crystal layer in the transmissive area and the reflective area carrying out a transition from a spray alignment into a bend alignment in response to an applied voltage.

According to the above arrangement, each of the transmissive area and the reflective area is driven in an OCB mode. This makes it unnecessary to realize the vertical alignment and the horizontal alignment in a minute area, unlike the Patent Document 1. Therefore, the liquid crystal display device of the present invention is more practical, and can be manufactured as a product. Therefore, the above arrangement makes it possible to provide a transflective type LCD device having low power consumption and high response speed. Further, this transflective type LCD device can be suitably used, for example, in a PDA which can display a moving image. Further, according to the above arrangement, a single nucleus generation section is provided in the pixel. This makes it possible to drive each of the transmissive area and the reflective area in the OCB mode while preventing lowering of transmittance and reflectance. Therefore, the above arrangement makes it possible to provide a transflective type LCD device in which each of a transmissive area and a reflective can be driven in the OCB mode, and it is possible to prevent a pixel from darkening in a case where each of a transmissive area and a reflective area is driven in the OCB mode.

In the liquid crystal display device of the present invention, it is preferable that the nucleus generation section is provided in the vicinity of a border between the reflective area and the transmissive area (i.e. border section of the two areas, or the vicinity of the border section) in the pixel. Here, it is desirable that the vicinity of the border indicates that the distance from the border line is less than 20 micron, more precisely, not more than 5 micron. Further, the liquid crystal display device of the present invention may be arranged such that the nucleus generation section is provided so as to straddle the border between the reflective area and the transmissive area.

According to the above arrangements, propagation of the bend alignment does not stop at the border between the reflective area and the transmissive area; and it is possible to surely realize the bend alignment both in the transmissive area and in the reflective area. This makes it possible to provide a transflective type LCD device having a high display quality.

Further, in the liquid crystal display device of the present invention, it is preferable that the border line between the reflective area and the transmissive area in the pixel has a concavity and convexity shape of two dimensions so that one of the reflective area and the transmissive area is partially surrounded by the other area. Further, in the liquid crystal display device of the present invention, it is preferable that the nucleus generation section is provided in the reflective area. Further, in the liquid crystal display device of the present invention, it is preferable that the nucleus generation section is provided in the transmissive area.

The following description deals with an example in which a part of the reflective area has a convex shape, and the nucleus generation section is provided in the transmissive area. First, the nucleus for the bend alignment is formed in the transmissive area, by the nucleus generation section. Then, the generated bend alignment spreads throughout the transmissive area. Here, a convex section of the reflective area which is not shifted to the bend alignment is surrounded, on three sides, by a concave section of the transmissive area which is shifted to the bend alignment. Then, a force due to surface tension causes the length of the border line between spray-oriented area and bend-oriented area to be short. That is, the force causes the convex section of the border to become a straight line. As a result, the bend alignment is propagated to the reflective area surrounded by the transmissive area which is already shifted to the bend alignment.

As described above, according to the above arrangement, due to the force which causes the length of the border line to be short, the bend alignment is propagated beyond the border between the two areas.

Therefore, according to the above arrangement, propagation of the bend alignment does not stop at the border between the reflective area and the transmissive area; and it is possible to surely realize the bend alignment both in the transmissive area and in the reflective area. This makes it possible to provide a transflective type LCD device having a high display quality. Further, it is not always necessary that the nucleus generation section is provided is in the border section or the like. It is possible to freely select a region where the nucleus generation section is provided.

Further, in the liquid crystal display device of the present invention, it is preferable that the nucleus generation section includes two layers of electrodes provided in different planes, an insulating layer being sandwiched between the two layers of electrodes; the nucleus generation section is an opening section provided in a part of an area in which one of the two layers of electrodes on a liquid crystal layer side and the other one of the two layers of electrodes overlap each other via the insulating layer; and the two layers of electrodes produce a difference in potential. Further, in the liquid crystal display device of the present invention, it is preferable that said one of the two layers of electrodes on the liquid crystal layer side is a pixel electrode. Further, in the liquid crystal display device of the present invention, it is preferable that said one of the two layers of electrodes on the liquid crystal layer side is a counter electrode. According to the above arrangement, a lateral electric field is generated due to a difference in potential between the two layers of electrodes provided in different planes between which the insulating layer is sandwiched. Therefore, it is possible to surely generate a nucleus for promoting a transition into a bend alignment.

In the liquid crystal display device of the present invention, it is preferable that the nucleus generation section is a projection formed on a surface of one of the pair of substrates, the surface facing the liquid crystal layer. Further, in the liquid crystal display device of the present invention, it is preferable that the projection is formed on a pixel electrode provided on the substrate. Further, in the liquid crystal display device of the present invention, it is preferable that the projection is formed on a counter electrode provided on the substrate.

According to the above arrangement, the nucleus generation section can be easily provided.

Figure 6:
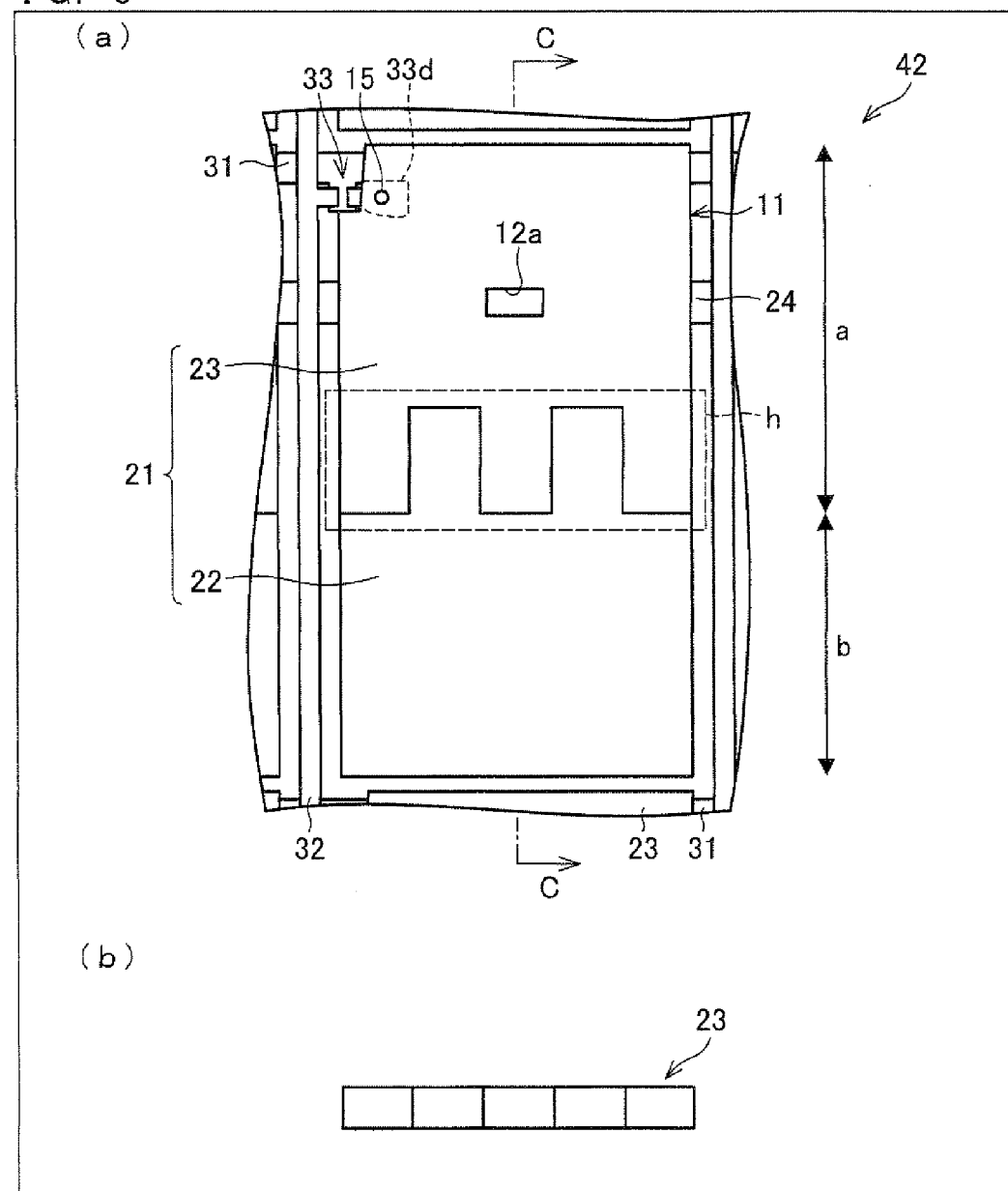

(a) of FIG. 6 is a plan view schematically illustrating an arrangement of one pixel of a TFT substrate in a liquid crystal display device of an embodiment of the present invention, and (b) of FIG. 6 is a view illustrating an end surface of a reflective electrode corresponding to a border line between a second transparent electrode and a reflective electrode in the TFT substrate shown in (a) of FIG. 6.

Figure 7:
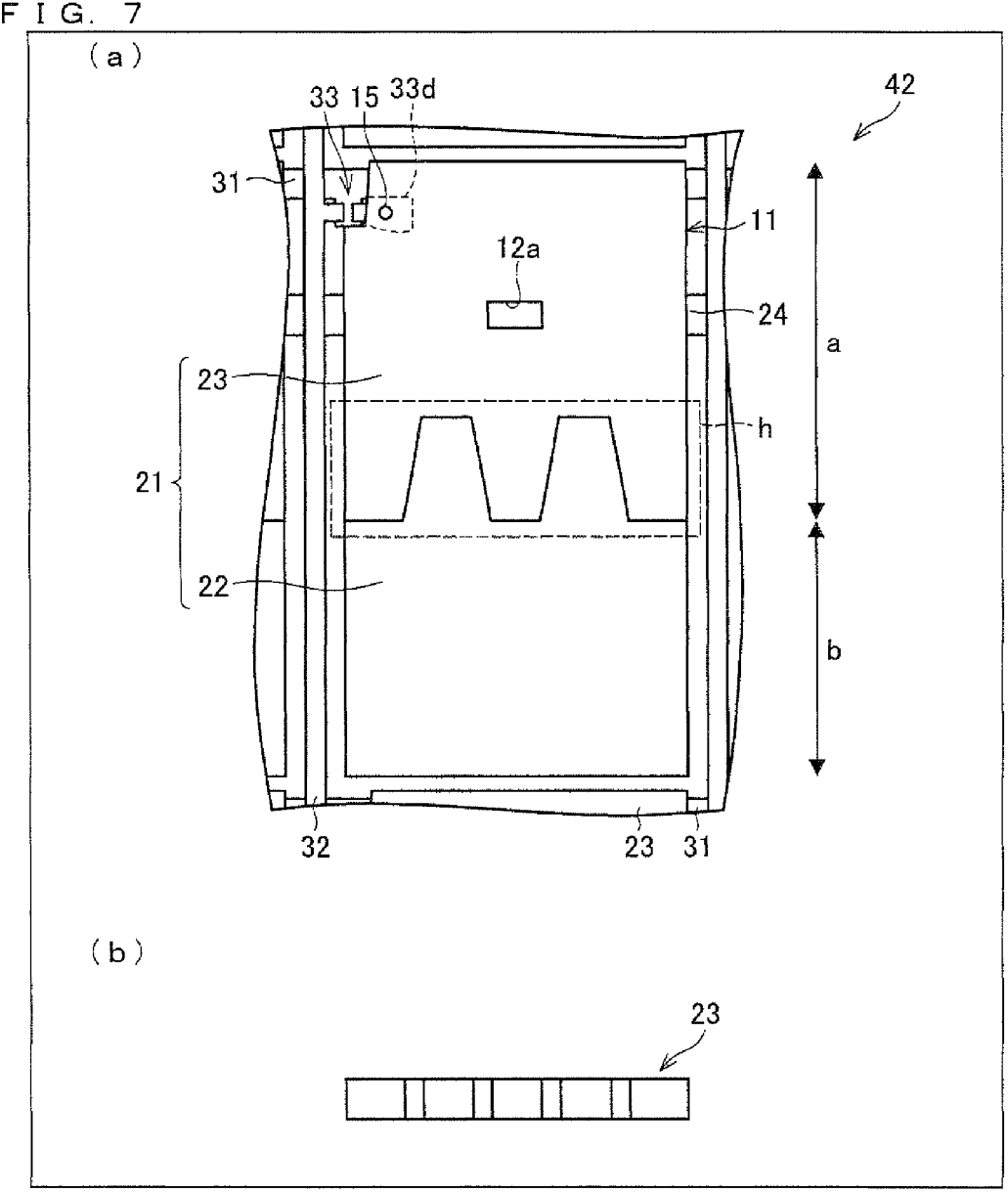

(a) of FIG. 7 is a plan view schematically illustrating an arrangement of one pixel of a TFT substrate in a liquid crystal display device of the embodiment of the present invention, and (b) of FIG. 7 is a view illustrating an end surface of a reflective electrode corresponding to a border line between a second transparent electrode and a reflective electrode in the TFT substrate shown in (a) of FIG. 7.

Figure 8:
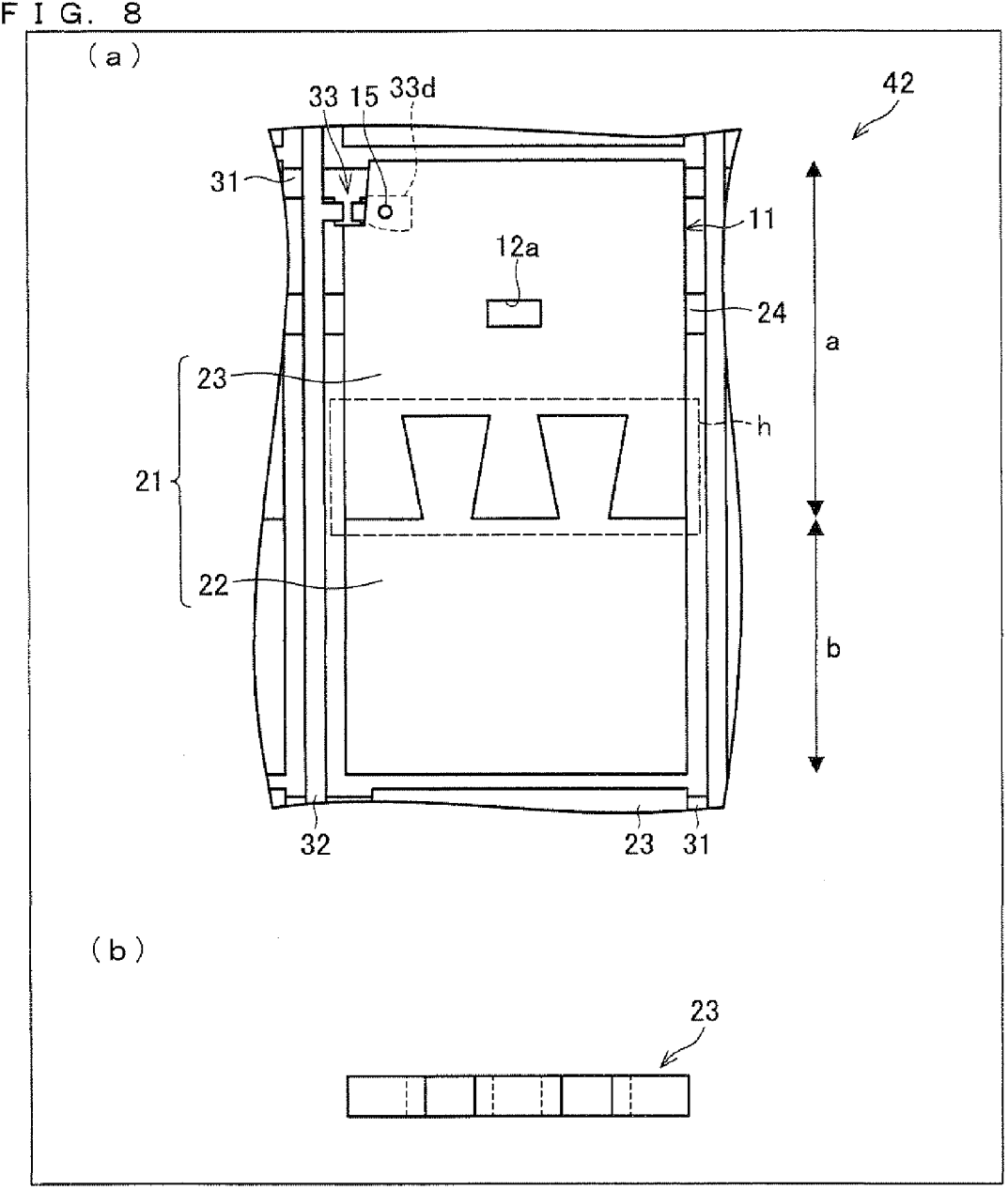
Figure 9:
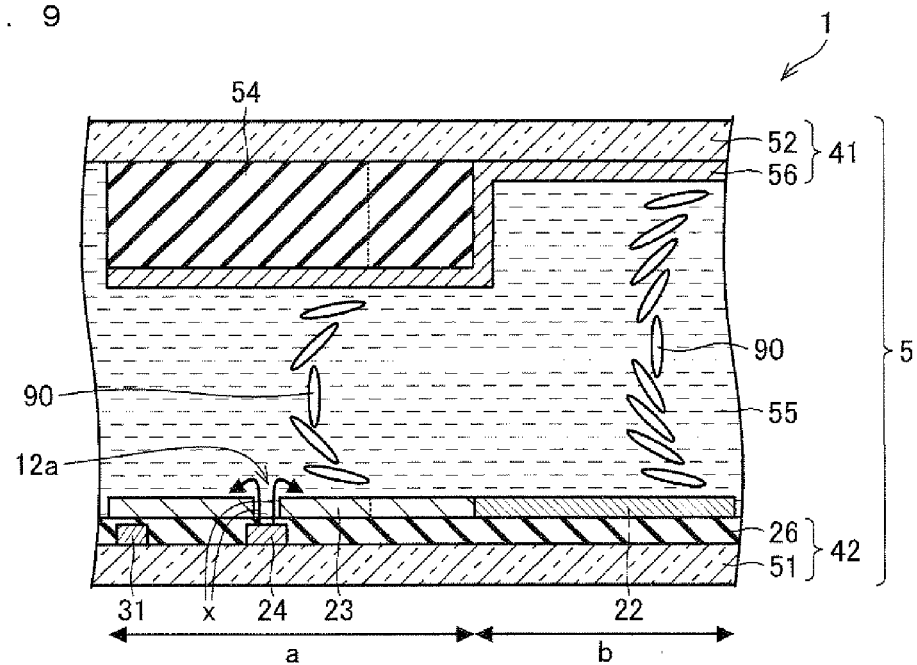

(a) of FIG. 8 is a plan view schematically illustrating an arrangement of one pixel of a TFT substrate in a liquid crystal display device of the embodiment of the present invention, and (b) of FIG. 8 is a view illustrating an end surface of a reflective electrode corresponding to border line between a second transparent electrode and a reflective electrode in the TFT substrate shown in (a) of FIG. 8, FIG. 9 is a cross-sectional view, taken on line C-C of (a) of FIG. 6, schematically illustrating an arrangement of a liquid crystal panel of the liquid crystal display device of the embodiment of the present invention.

Figure 10:
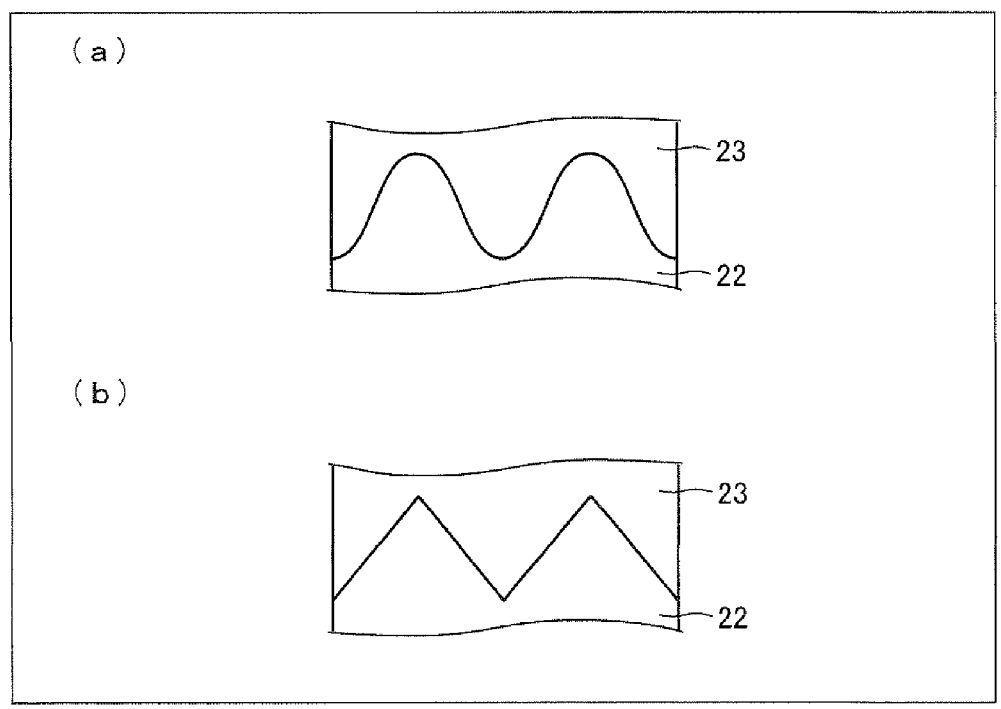

FIG. 10 is a view illustrating a border line between a second transparent electrode and a reflective electrode of a TFT substrate in a liquid crystal display device of the embodiment of the present invention.

Figure 11:
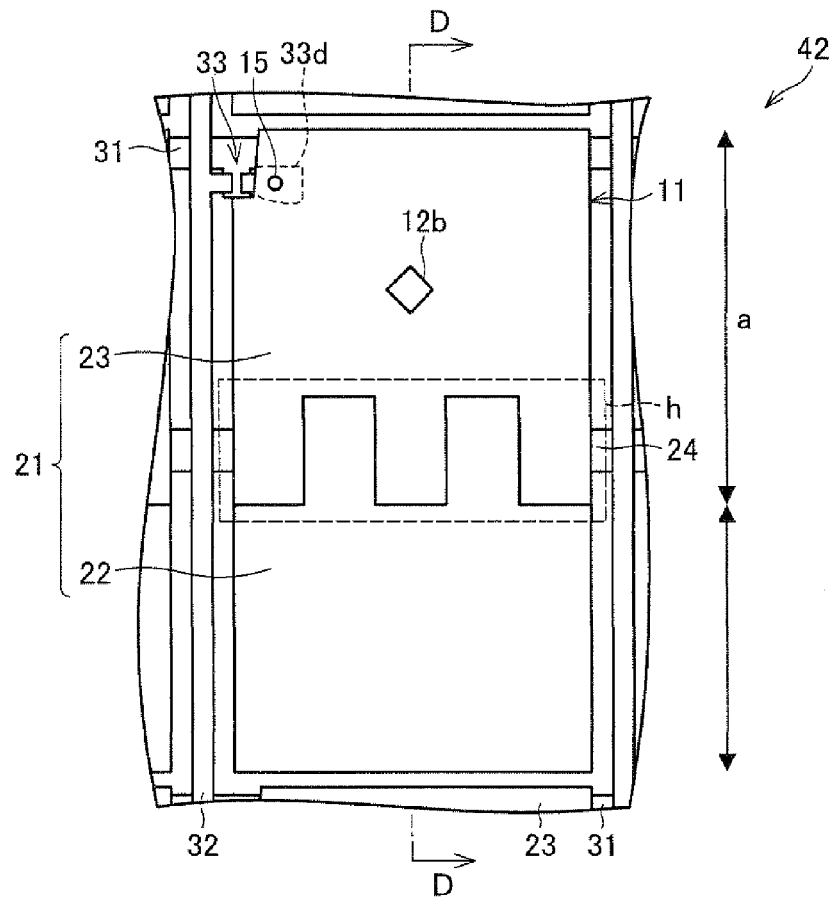

FIG. 11 is a plan view schematically illustrating an arrangement of one pixel of a TFT substrate in a liquid crystal display device of the embodiment of the present invention.

Figure 12:
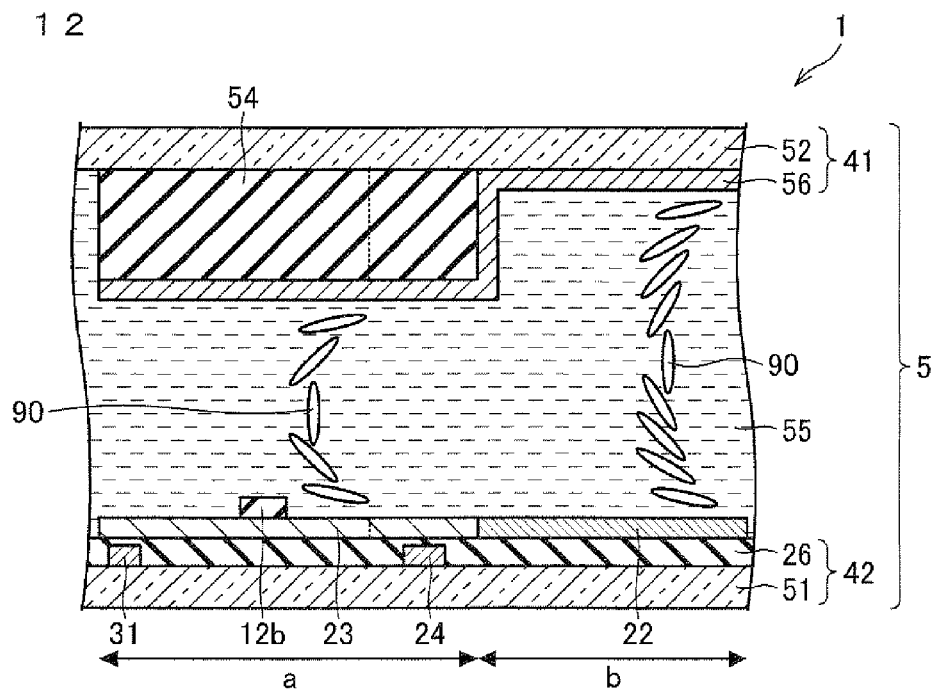

FIG. 12 is a cross-sectional view, taken on line D-D of FIG. 11, schematically illustrating an arrangement of a liquid crystal panel of the liquid crystal display device of the embodiment of the present invention.

Figure 13:
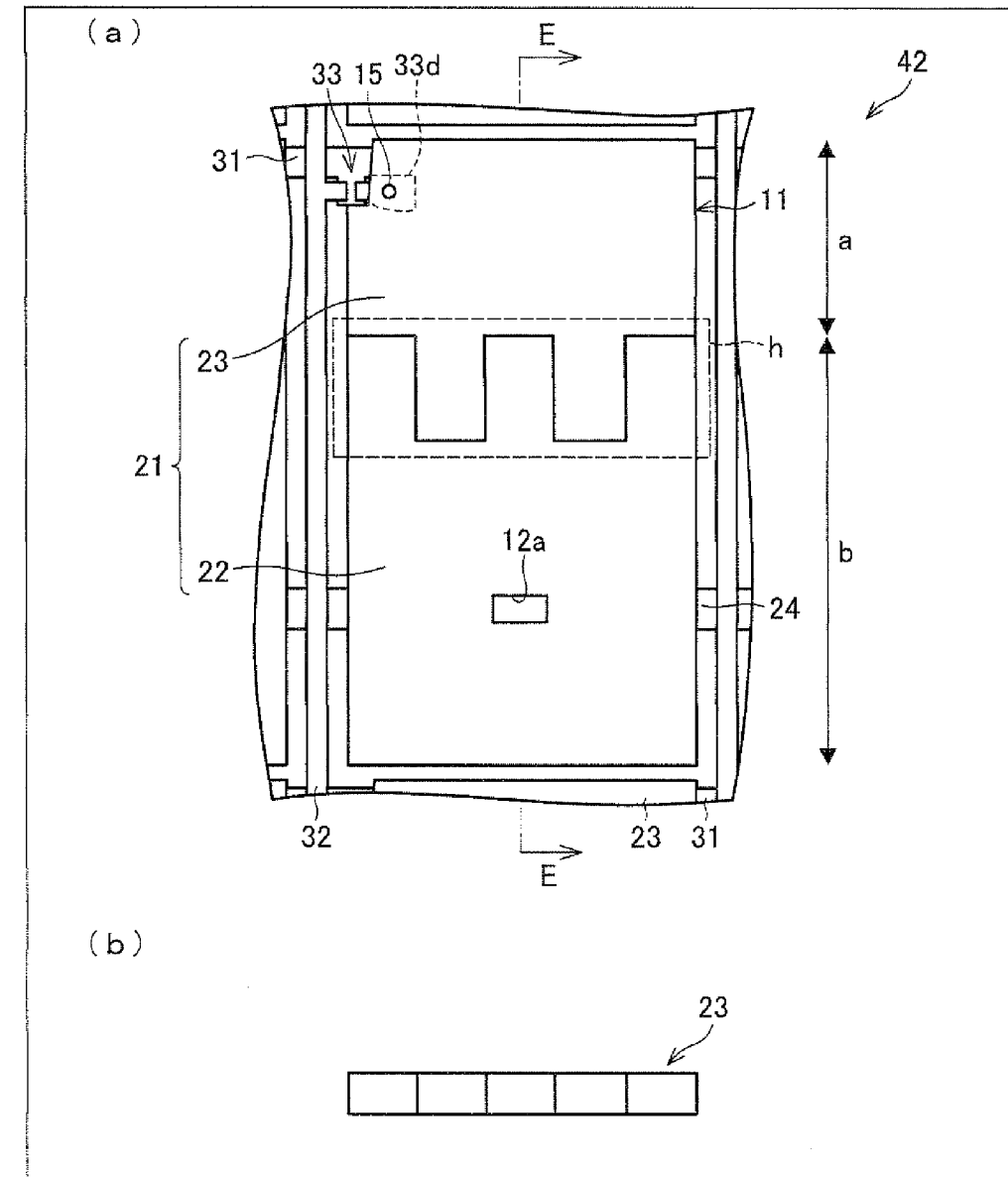

(a) of FIG. 13 is a plan view schematically illustrating an arrangement of one pixel of a TFT substrate in a liquid crystal display device of an embodiment of the present invention, and (b) of FIG. 13 is a view illustrating an end surface of a reflective electrode corresponding to a border line between a second transparent electrode and a reflective electrode in the TFT substrate shown in (a) of FIG. 13.

Figure 14:
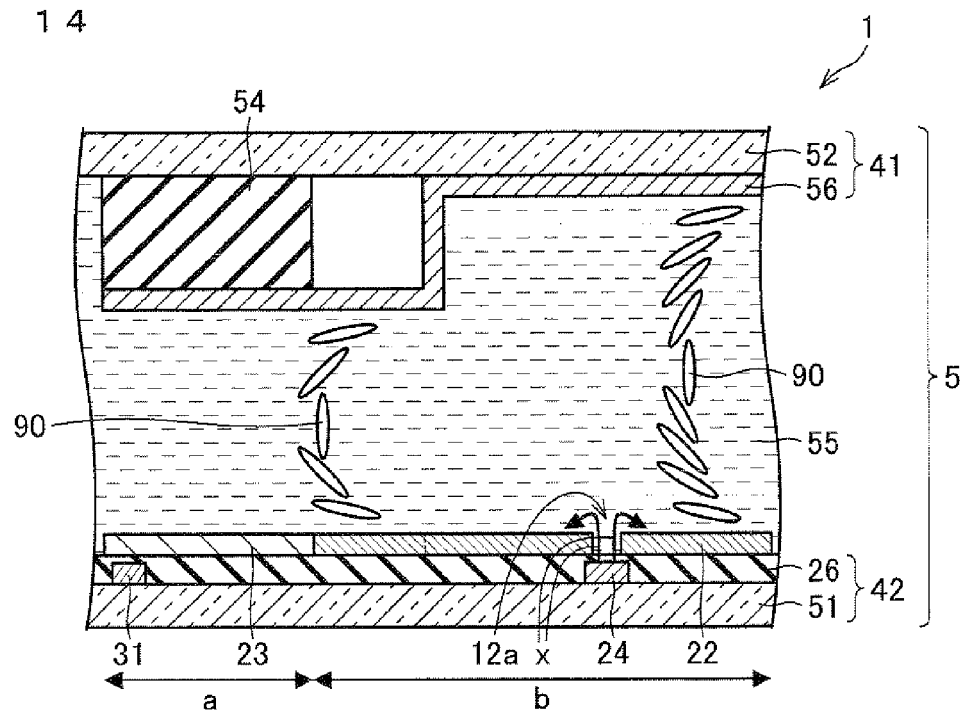

FIG. 14 is a cross-sectional view, taken on line E-E of (a) of FIG. 13, schematically illustrating an arrangement of a liquid crystal panel of the liquid crystal display device of the embodiment of the present invention.

Figure 15:
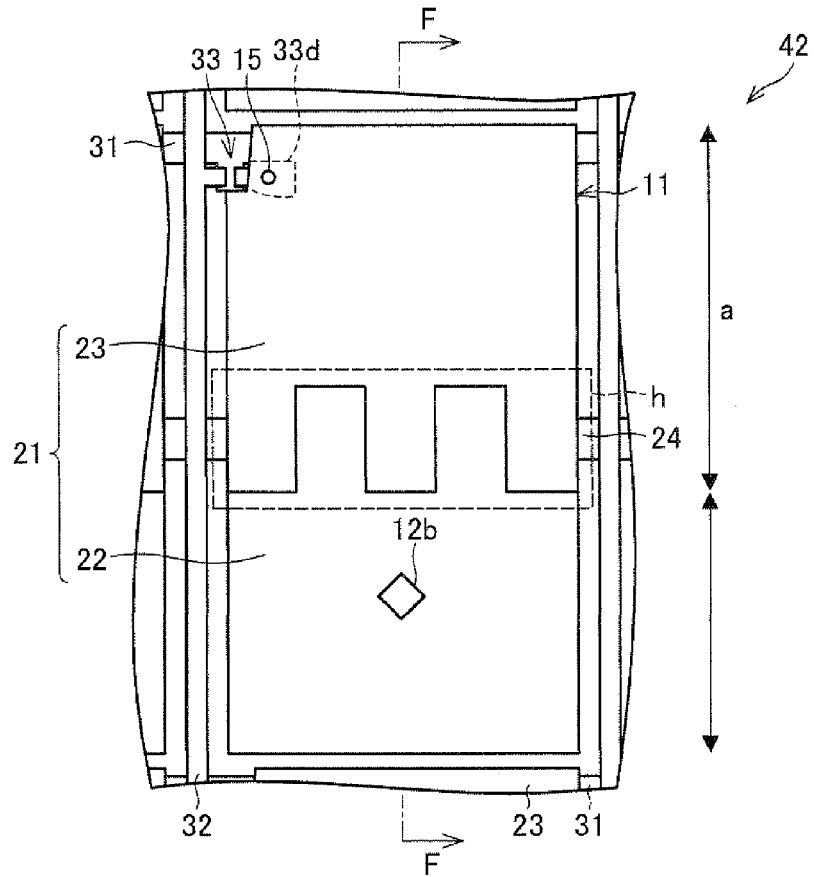

FIG. 15 is a plan view schematically illustrating an arrangement of one pixel of a TFT substrate in a liquid crystal display device of an embodiment of the present invention.

Figure 16:
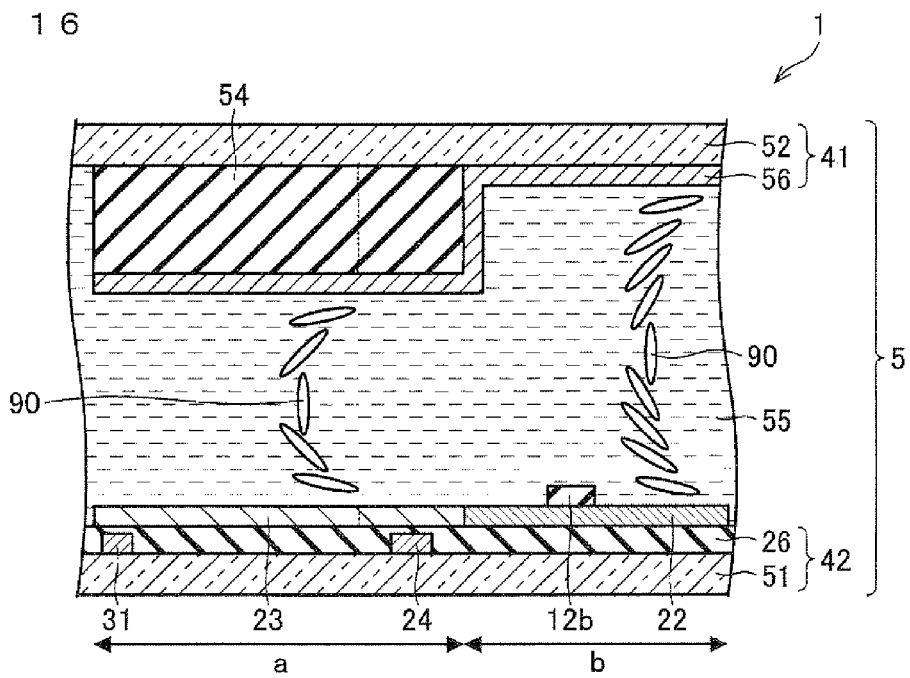

FIG. 16 is a cross-sectional view, taken on line F-F of FIG. 15, schematically illustrating an arrangement of a liquid crystal panel of the liquid crystal display device of the embodiment of the present invention.

Figure 17:
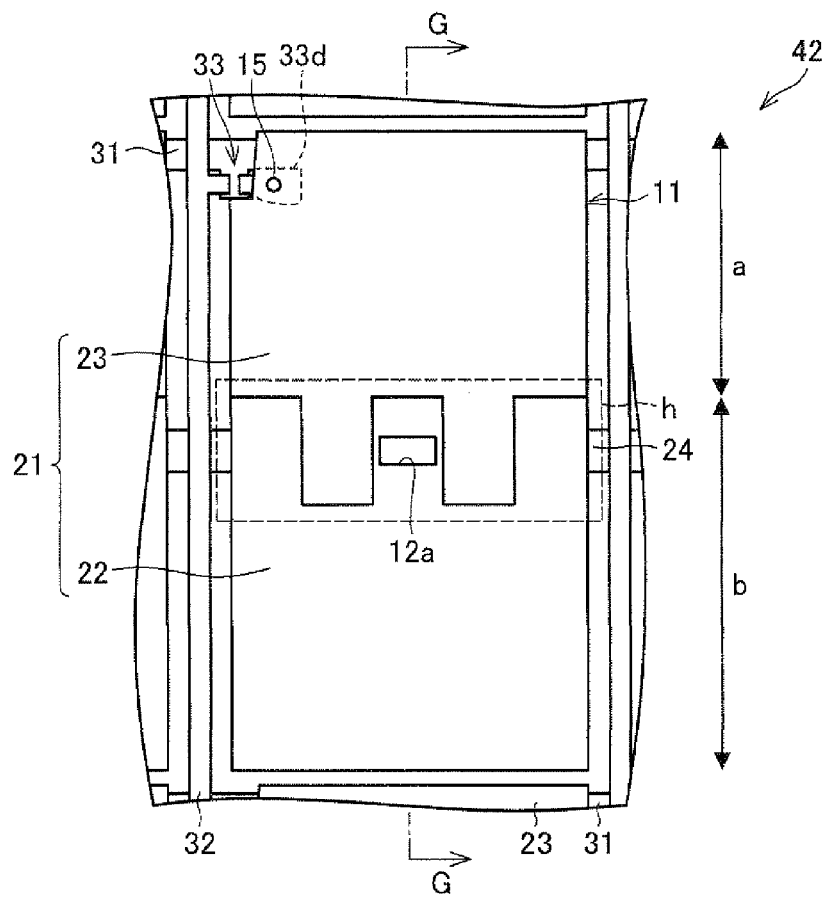

FIG. 17 is a plan view schematically illustrating an arrangement of one pixel of a TFT substrate in a liquid crystal display device of an embodiment of the present invention.

Figure 18:
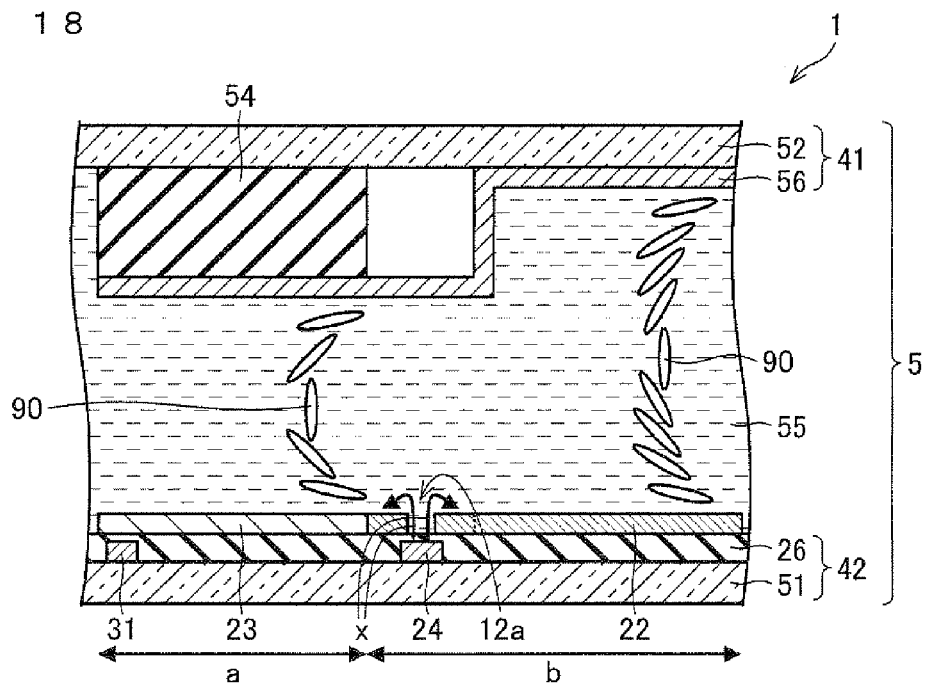

FIG. 18 is a cross-sectional view, taken on line G-G of FIG. 17, schematically illustrating an arrangement of a liquid crystal panel of the liquid crystal display device of the embodiment of the present invention.

Figure 19:
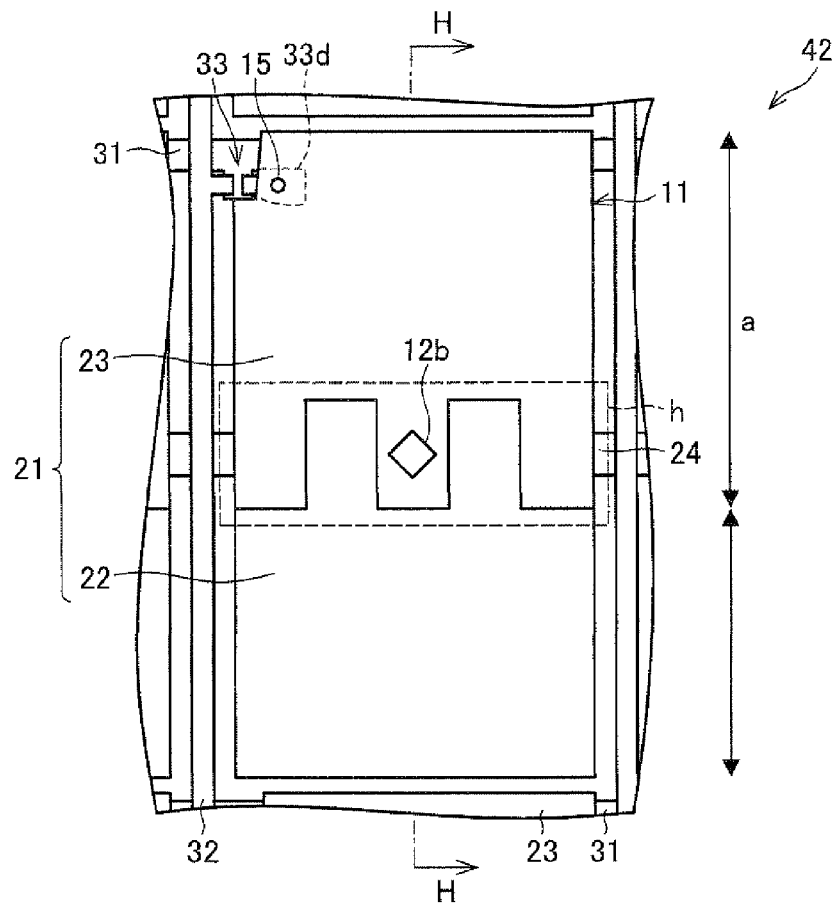

FIG. 19 is a plan view schematically illustrating an arrangement of one pixel of a TFT substrate in a liquid crystal display device of an embodiment of the present invention.

Figure 20:
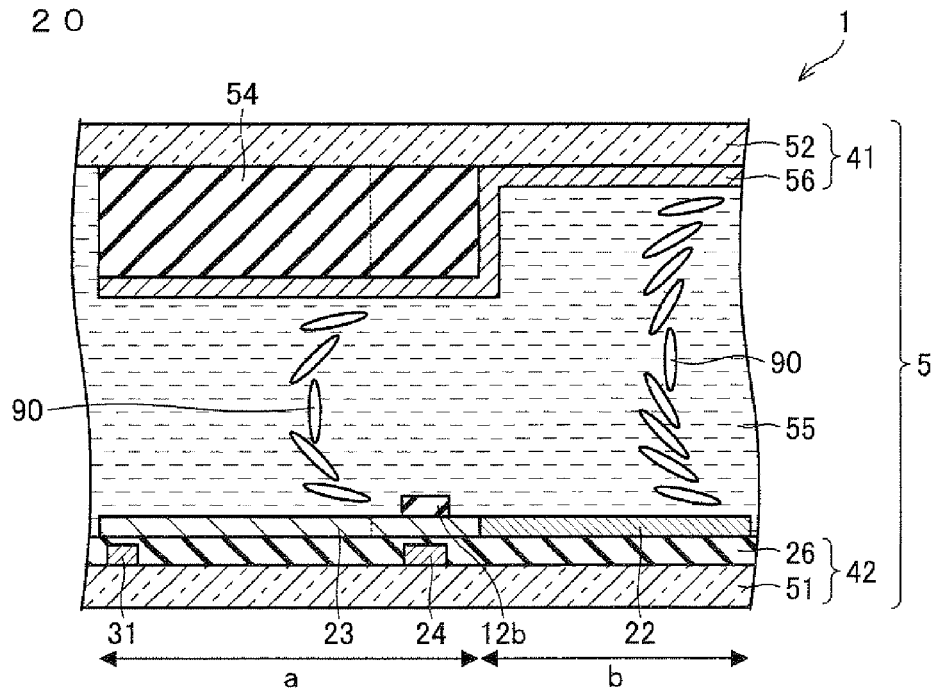

FIG. 20 is a cross-sectional view, taken on line H-H of FIG. 19, schematically illustrating an arrangement of a liquid crystal panel of the liquid crystal display device of the embodiment of the present invention.

Figure 21:
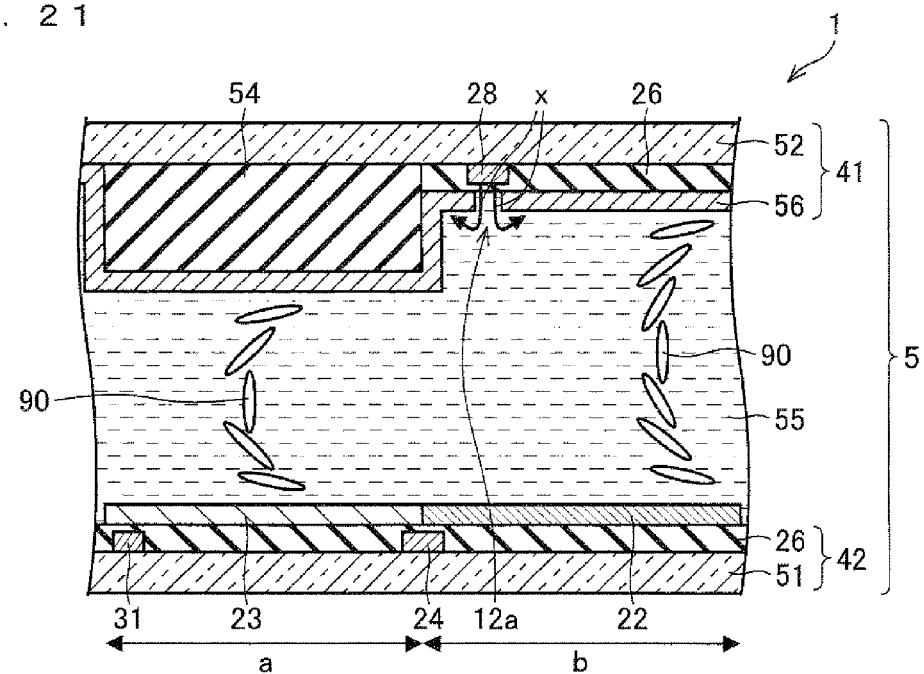

FIG. 21 is a cross-sectional view schematically illustrating an arrangement of a liquid crystal panel in a liquid crystal display device of an embodiment of the present invention.

Figure 22:
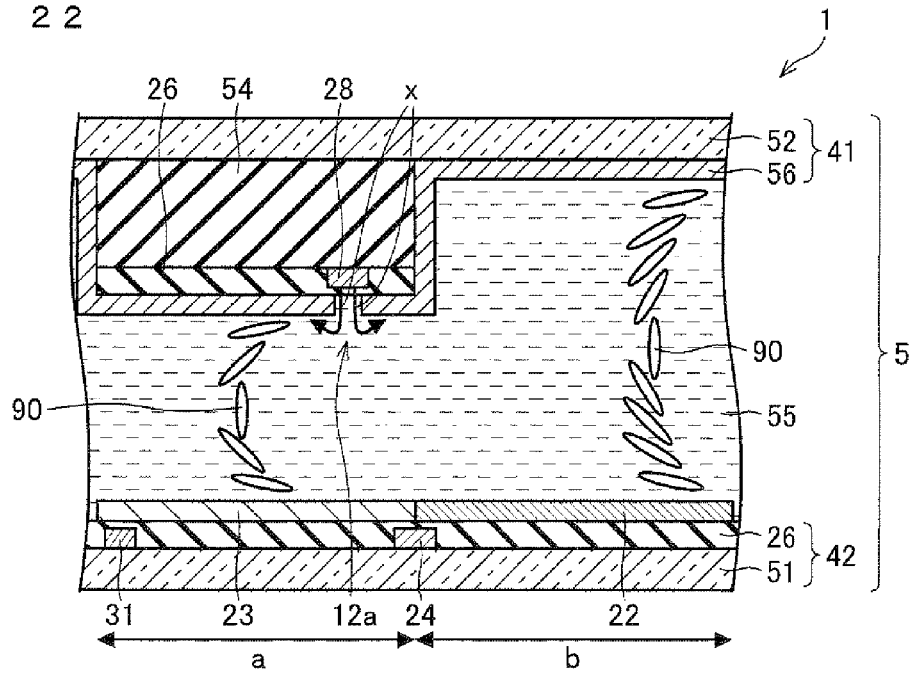

FIG. 22 is a cross-sectional view schematically illustrating an arrangement of a liquid crystal panel in a liquid crystal display device of an embodiment of the present invention.

Figure 23:
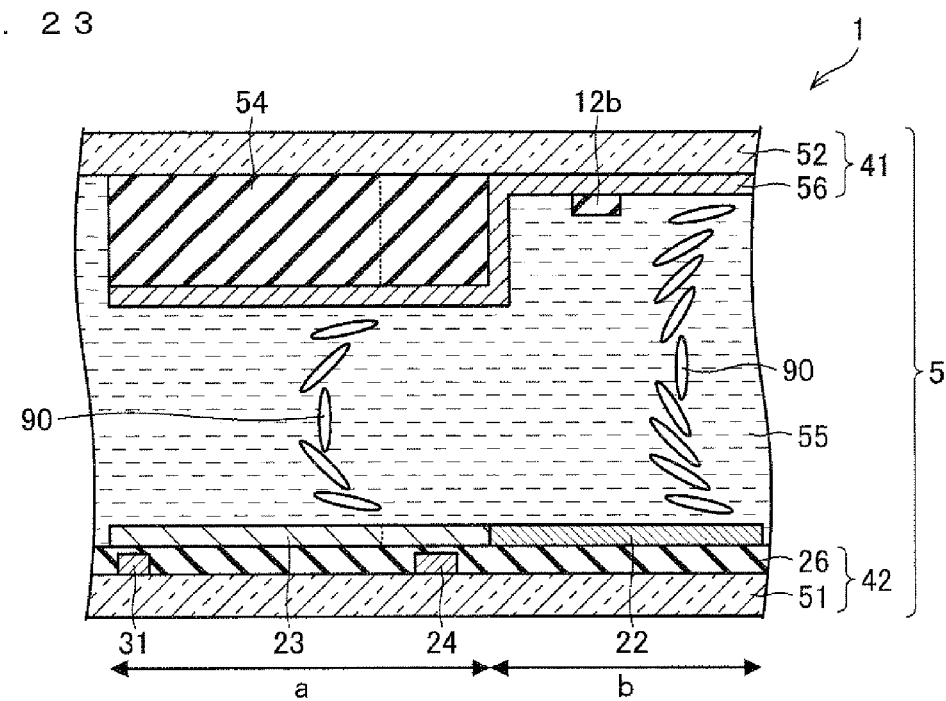

FIG. 23 is a cross-sectional view schematically illustrating an arrangement of a liquid crystal panel in a liquid crystal display device of an embodiment of the present invention.

Figure 24:
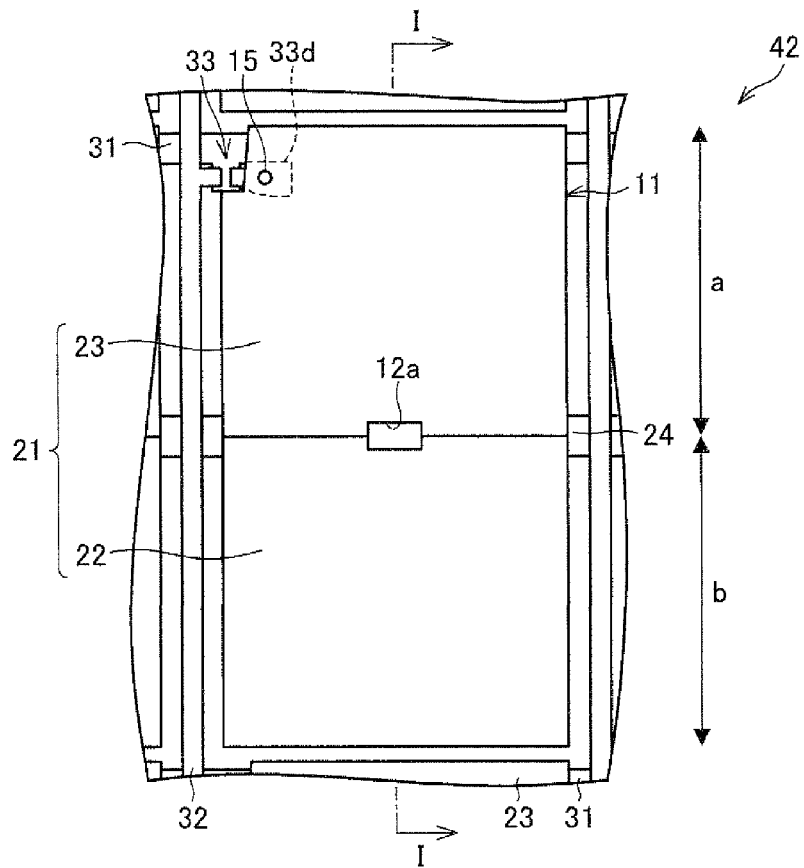

FIG. 24 is a plan view schematically illustrating an arrangement of one pixel of a TFT substrate in a liquid crystal display device of an embodiment of the present invention.

Figure 25:
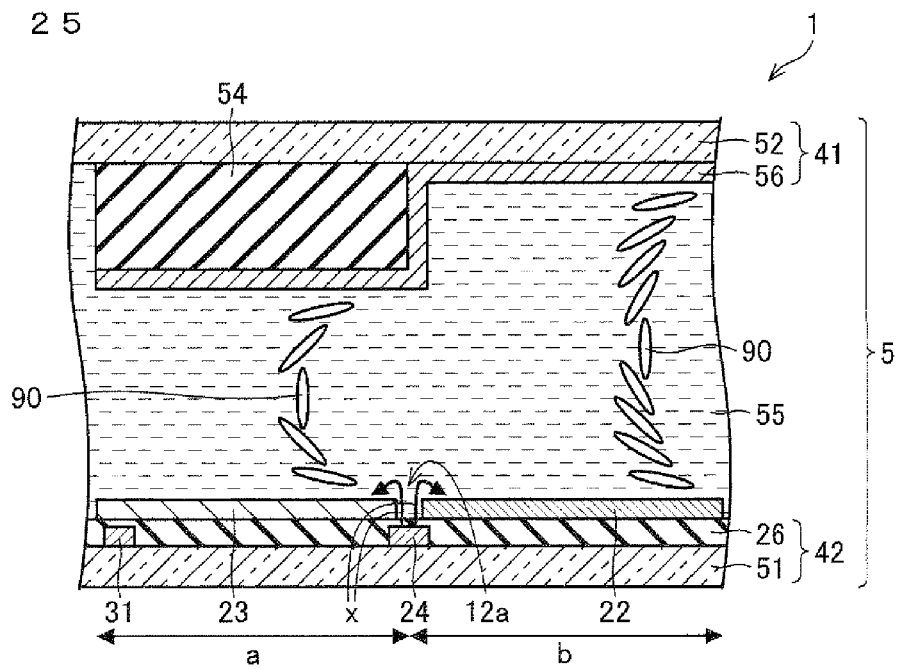

FIG. 25 is a cross-sectional view, taken on line I-I of FIG. 24, schematically illustrating an arrangement of a liquid crystal panel of the liquid crystal display device of the embodiment of the present invention.

Figure 26:
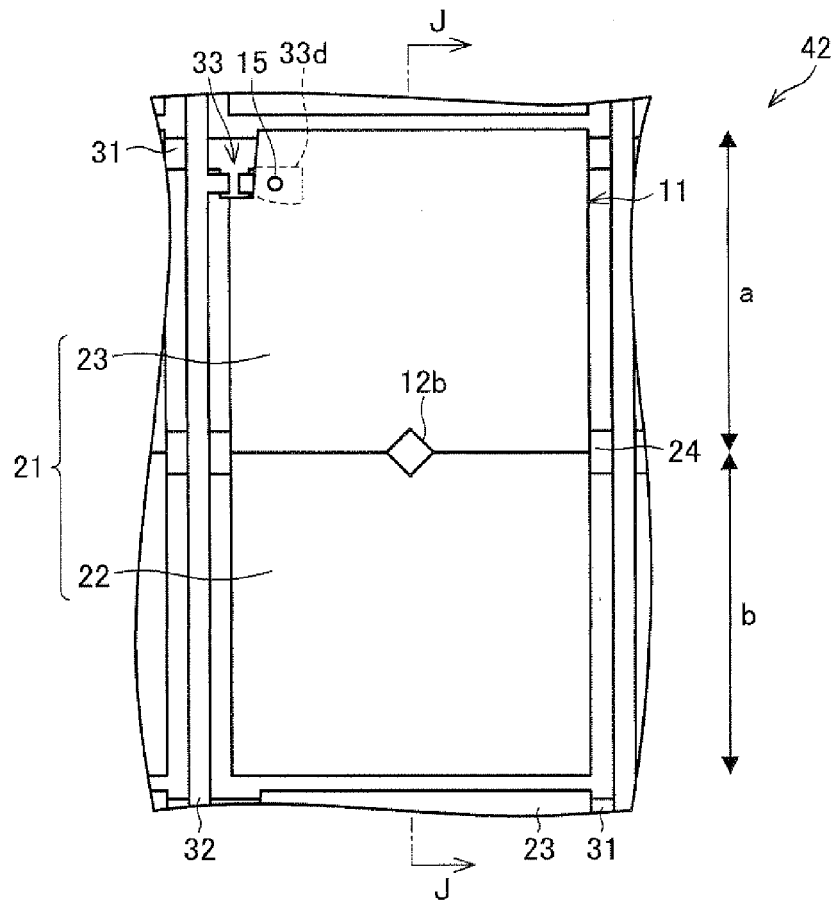

FIG. 26 is a plan view schematically illustrating an arrangement of one pixel of a TFT substrate in a liquid crystal display device of an embodiment of the present invention.

Figure 27:
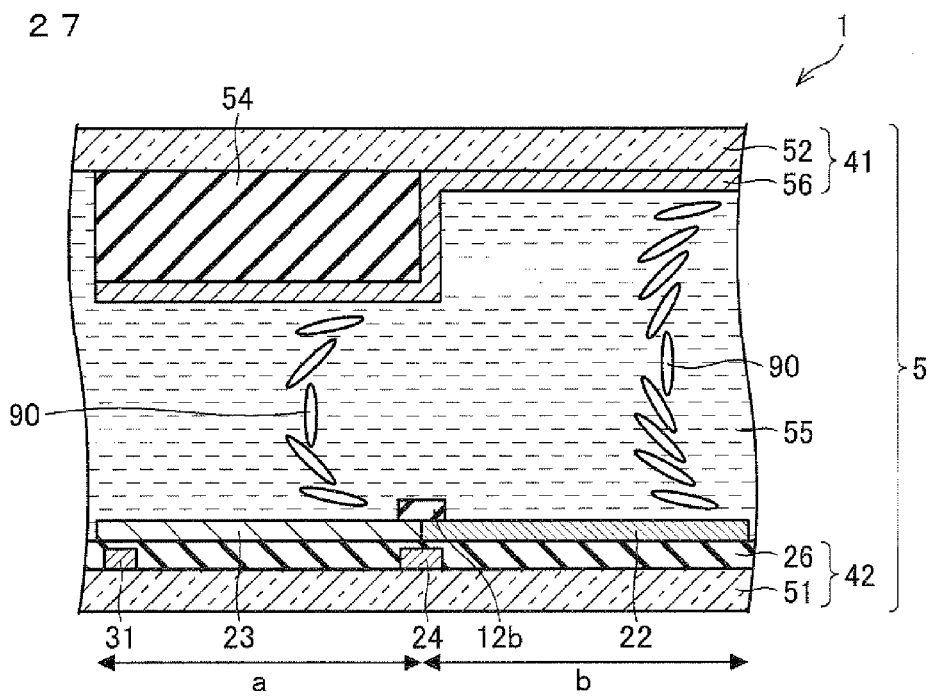

FIG. 27 is a cross-sectional view, taken on line J-J of FIG. 26, schematically illustrating an arrangement of a liquid crystal panel of the liquid crystal display device of the embodiment of the present invention.

Figure 28:
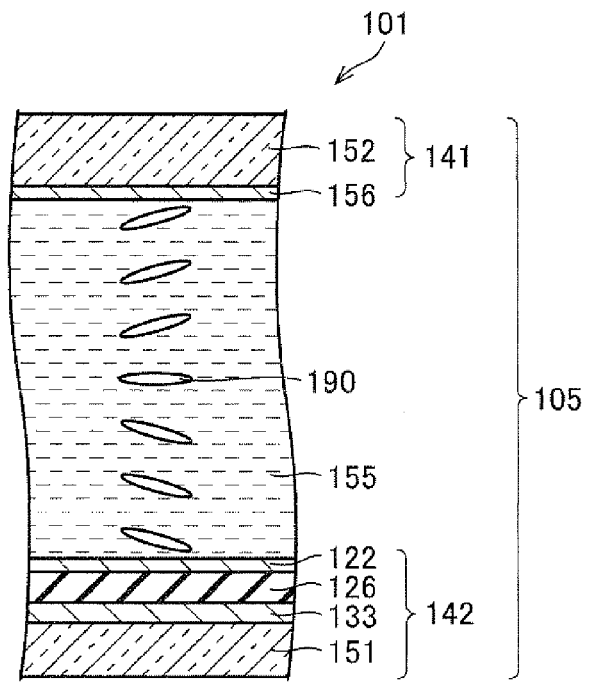

FIG. 28 is a cross-sectional view schematically illustrating a conventional liquid crystal display device using an OCB mode under no applied voltage.

Figure 29:
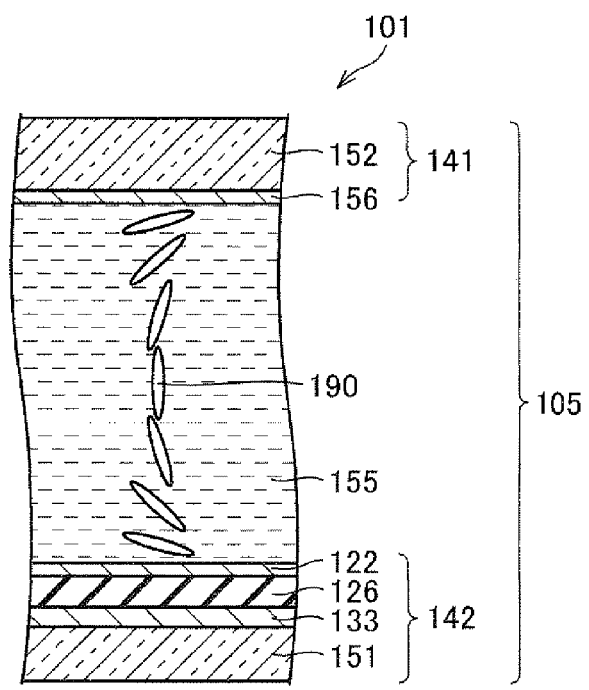

FIG. 29 is a cross-sectional view schematically illustrating a conventional liquid crystal display device using an OCB mode under applied voltage.

Figure 30:
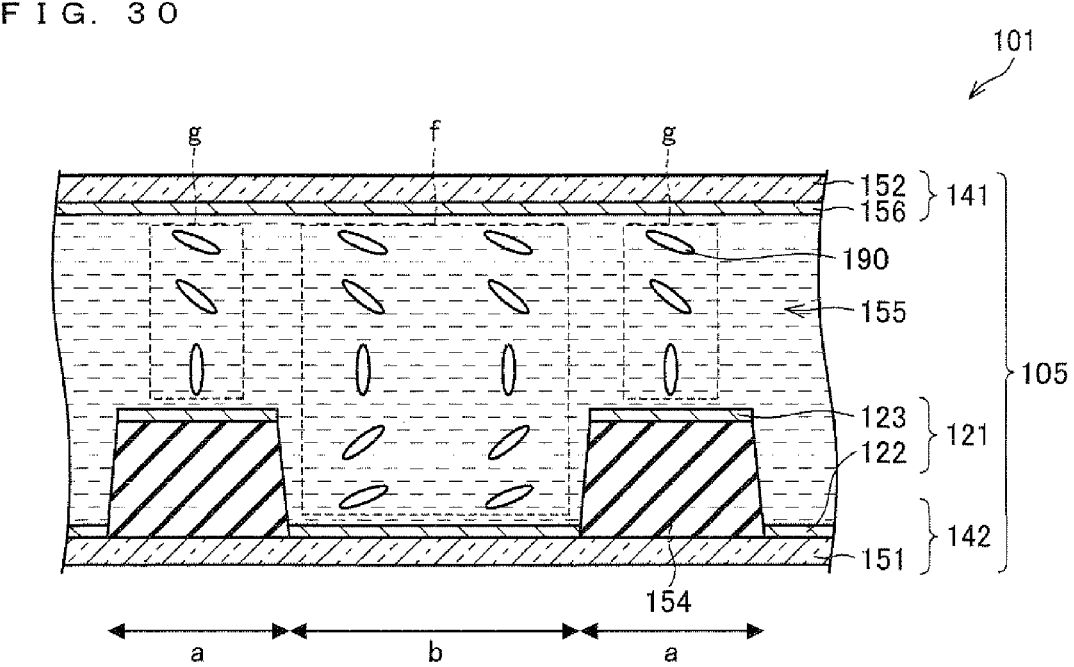

FIG. 30 is a cross-sectional view schematically illustrating a liquid crystal display device of the Patent Document 1.

Figure 31:
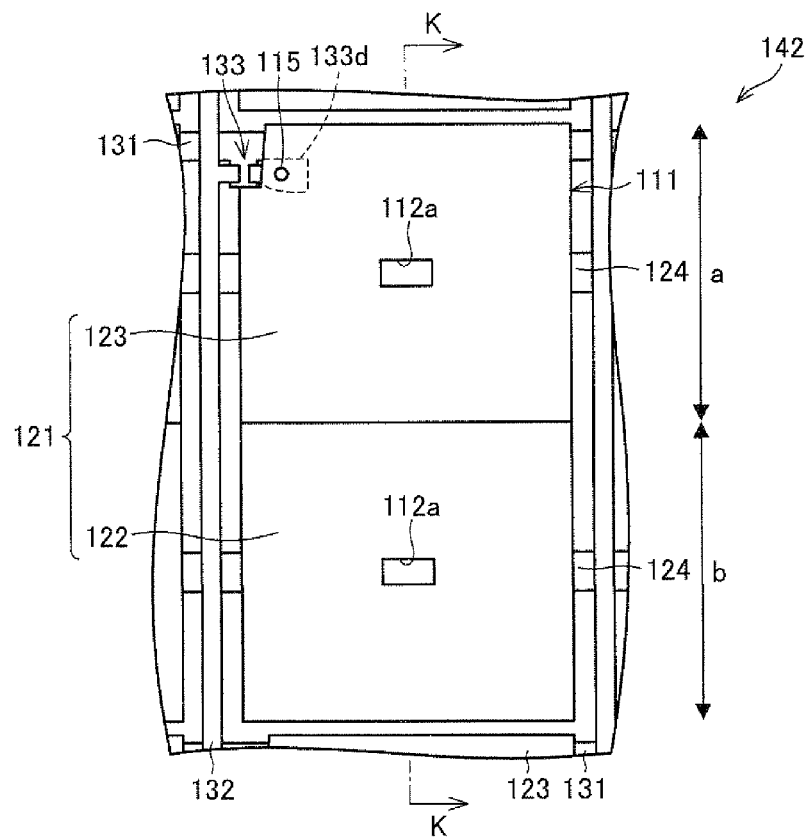

FIG. 31 is a plan view schematically illustrating an arrangement of one pixel of a TFT substrate in a liquid crystal display device, in which a technique for forming cutout parts in a pixel electrode is applied to a transflective type LCD device.

Figure 32:
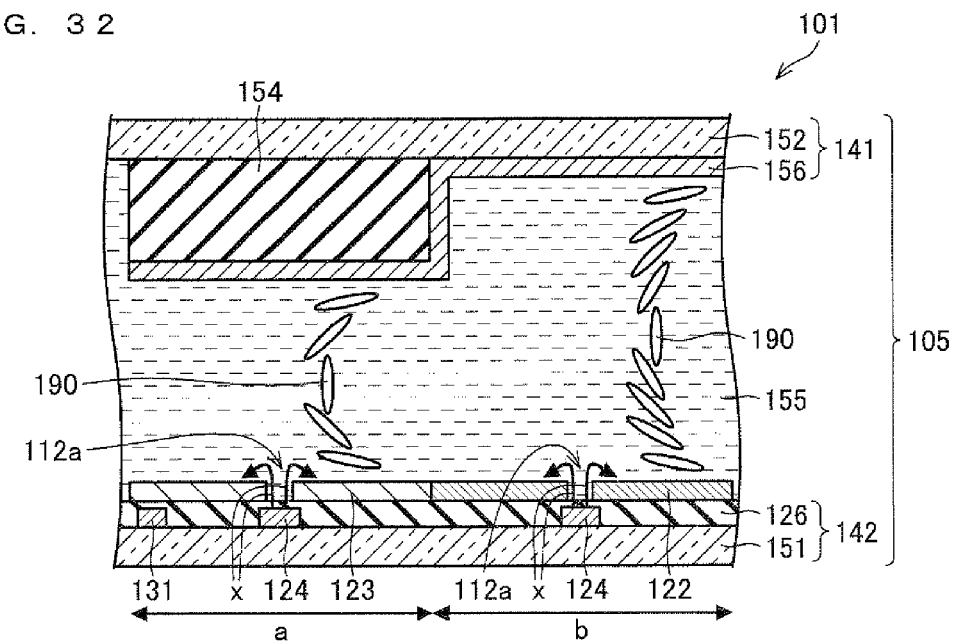

FIG. 32 is a cross-sectional view, taken on line K-K of FIG. 31, schematically illustrating an arrangement of a liquid crystal panel of the liquid crystal display device, in which the technique for forming cutout parts (slits) in a pixel electrode is applied to a transflective type LCD device.

Figure 33:
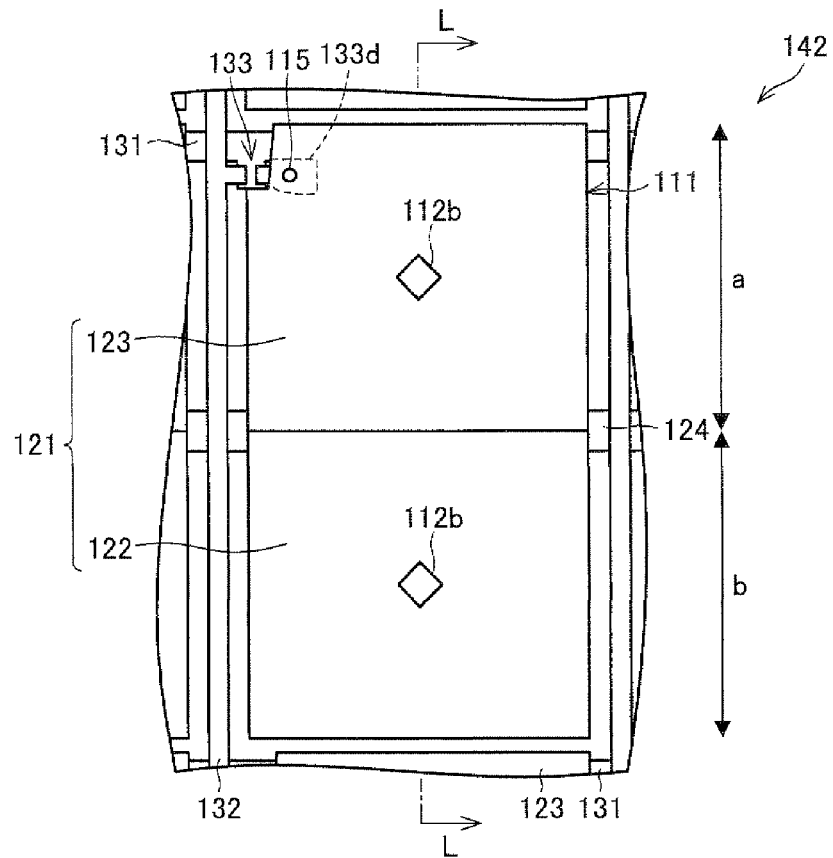

FIG. 33 is a plan view schematically illustrating an arrangement of one pixel of a TFT substrate in a liquid crystal display device, in which a technique for forming projections on a pixel electrode is applied to a transflective type LCD device.

Figure 34:
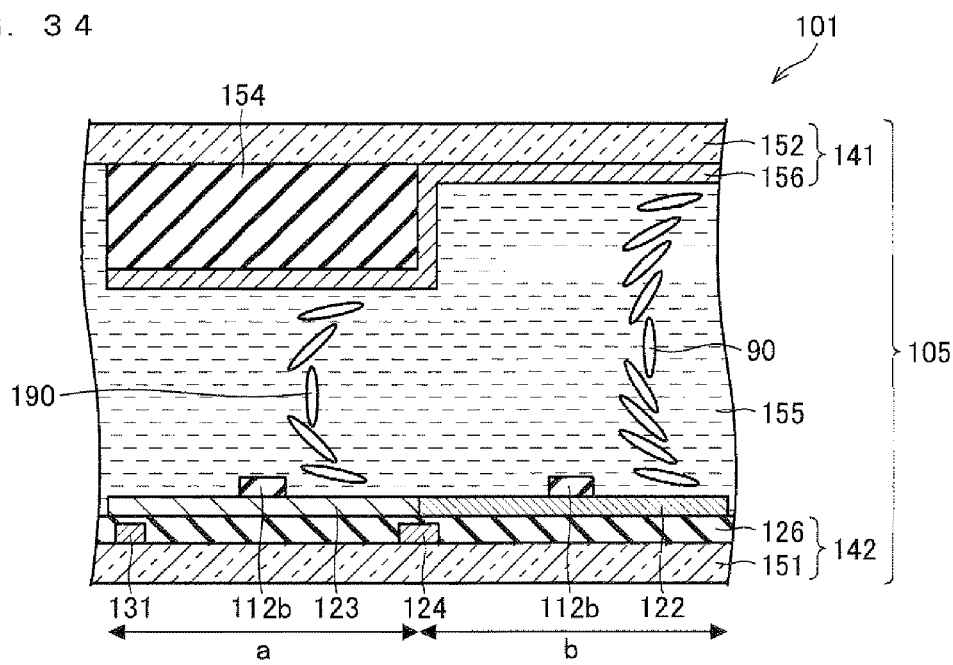

FIG. 34 is a cross-sectional view, taken on line L-L of FIG. 33, schematically illustrating an arrangement of a liquid crystal panel of the liquid crystal display device, in which the technique for forming projections on a pixel electrode is applied to a transflective type LCD device.

EXPLANATION OF REFERENCE NUMERALS

1: Liquid crystal display device
5: Liquid crystal panel
11: Pixel
12a: Slit
12b: Projection
15: Contact hole
21: Pixel electrode
22: Second transparent electrode
23: Reflective electrode
24: Common electrode
25: Intermediate electrode
26: Insulating layer
28: Auxiliary electrode
31: Gate bus line
32: Data bus line
33: TFT
41: Color filter substrate (substrate)
42: TFT substrate (substrate)
51: Second glass substrate
52: First glass substrate
53: Color filter
54: Step resin layer
55: Liquid crystal layer
56: First transparent electrode
58: First alignment film
59: Second alignment film
61: First linear polarizing plate
62: Second linear polarizing plate
63: First wave plate
64: Second wave plate
65: Third wave plate
66: Fourth wave plate
81: Light source section
82: Light source
83: Light guide plate
90: Liquid crystal molecule

BEST MODE FOR CARRYING OUT THE INVENTION

One embodiment of the present invention is described below with reference to FIGS. 1 through 5.

Figure 3:
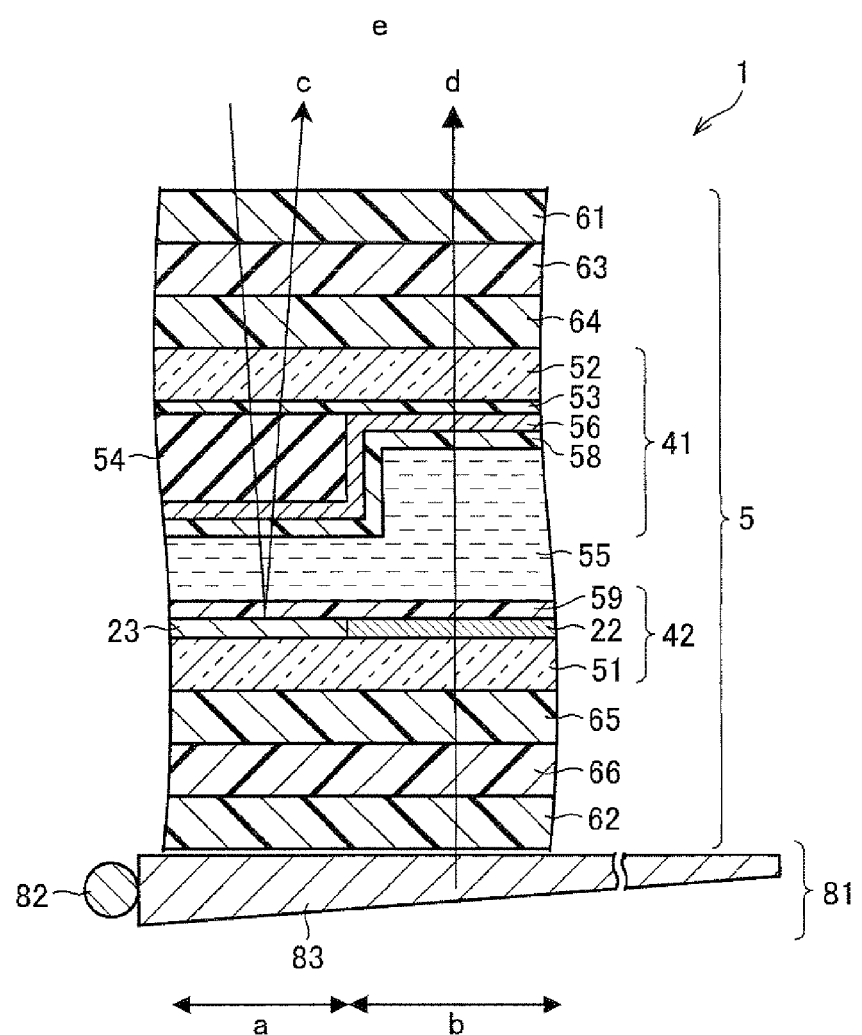
FIG. 3 is a cross-sectional view schematically illustrating a substantial part of a liquid crystal display device of the embodiment of the present invention.

FIG. 3 is a cross-sectional view schematically illustrating a substantial part of a liquid crystal display device of the embodiment of the present invention.

As shown in FIG. 3, a liquid crystal display device 1 includes a liquid crystal panel 5 and a light source section 81 (backlight) provided on a back surface of the liquid crystal panel 5. The light source section 81 includes a light source 82 and a light guide plate 83.

The liquid crystal panel includes a color filter substrate 41, a TFT substrate 42, and a liquid crystal layer 55 sandwiched between the color filter substrate 41 and the TFT substrate 42.

The liquid crystal display device 1 includes, within one pixel, (i) a reflective area a acting as a reflective display section and (ii) a transmissive area b acting as a transmissive display section. The liquid crystal display device 1 is a transflective type LCD device for switching between transmissive display and reflective display by turning on or off the light source section 81 in accordance with brightness of a surrounding environment. The liquid crystal display device 1 is arranged such that the liquid crystal layer 55 has a thickness which is thinner in the transmissive area b than in the reflective area a.

The TFT substrate 42 includes a second glass substrate 51 serving as a base substrate. A reflective electrode 23 and a second transparent electrode 22 are provided in the reflective area a and the transmissive area, b, respectively, on a surface side of the second glass substrate 51 which surface side faces the color filter substrate 41. The reflective electrode 23 and the second transparent electrode 22 constitute a single electrode layer. Further, a second alignment film 59 is formed on the electrode layer, that is, on the second transparent electrode 22 and the reflective electrode 23 so as to cover the electrode layer.

On the other hand, the color filter substrate 41 includes a first glass substrate 52 serving as a base substrate. The color filter substrate 41 is arranged such that a color filter 53, a first transparent electrode 56, and a first alignment film 58 are provided on the first glass substrate 52 in this order from a color filter 53 side.

Each of the first and second alignment films 58 and 59 is subjected to a horizontal alignment process which causes liquid crystal molecules in the liquid crystal layer 55 to be in a spray alignment state.

Further, in the reflective area a of the color filter substrate 41, a step resin layer 54 is formed between the color filter 53 and the first transparent electrode 56. The step resin layer 54 controls the thickness of the liquid crystal layer 55 so as to reduce a difference in optical path length between the reflective area a and the transmissive area b. The optical path length is a distance that light travels during its transmitting in the liquid crystal layer 55.

In the liquid crystal display device 1, an image is displayed in the transmissive area b as follows. Specifically, light entered from the light source section 81 into the liquid crystal panel 5 passes through the liquid crystal layer 55 just once, and then emerges, as display light, from a display surface (see the arrow d shown in FIG. 3). On the other hand, in the reflective area a, light entered into the display surface from a side of an observer e passes through the liquid crystal layer 55, is reflected by the reflective electrode 23, passes through the liquid crystal layer 55 again, and then emerges from the display surface as display light (see the arrow c shown in FIG. 3).

Therefore, according to the present embodiment, a length of the step resin layer 54 in a direction perpendicular to the first glass substrate, that is, a height of the step resin layer 54 is set to be substantially half a distance between the first glass substrate 52 and the second glass substrate 51. This causes the optical path length in the reflective area a to be the same as that in the transmissive area b.

Further, a second wave plate 64, a first wave plate 63, and a first linear polarizing plate 61 are formed, in this order from the first glass substrate 52 side, on a surface of the first glass substrate 52 of the color filter substrate 41 which surface does not face the liquid crystal layer 55.

A third wave plate 65, a fourth wave plate 66, and a second linear polarizing plate 62 are formed, in this order from the second glass substrate 51, on a surface of the second glass substrate 51 of the TFT substrate 42 which surface does not face the liquid crystal layer 55.

Here, the second wave plate 64 and the third wave plate 65 are wave films (negative wave films) made of an optical medium with negative reflective index anisotropy whose main axis is hybrid-aligned. The first wave plate 63 and the fourth wave plate 66 are so-called biaxial wave films which have both a function of a negative uniaxial wave film and a function of a positive uniaxial wave film.

Each of the first and second alignment films 58 and 59 is subjected to a horizontal alignment process which causes liquid crystal molecules to be in a spray alignment state.

Figure 1:
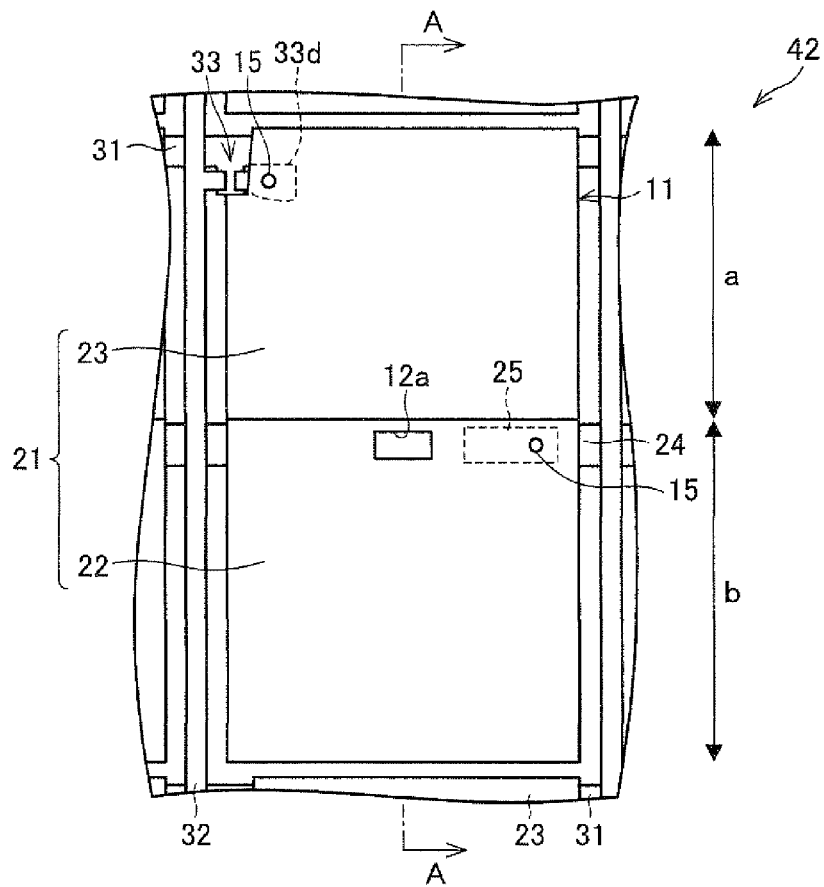
FIG. 1 is a plan view schematically illustrating an arrangement of one pixel of a TFT substrate in a liquid crystal display device of an embodiment of the present invention.
Figure 2:
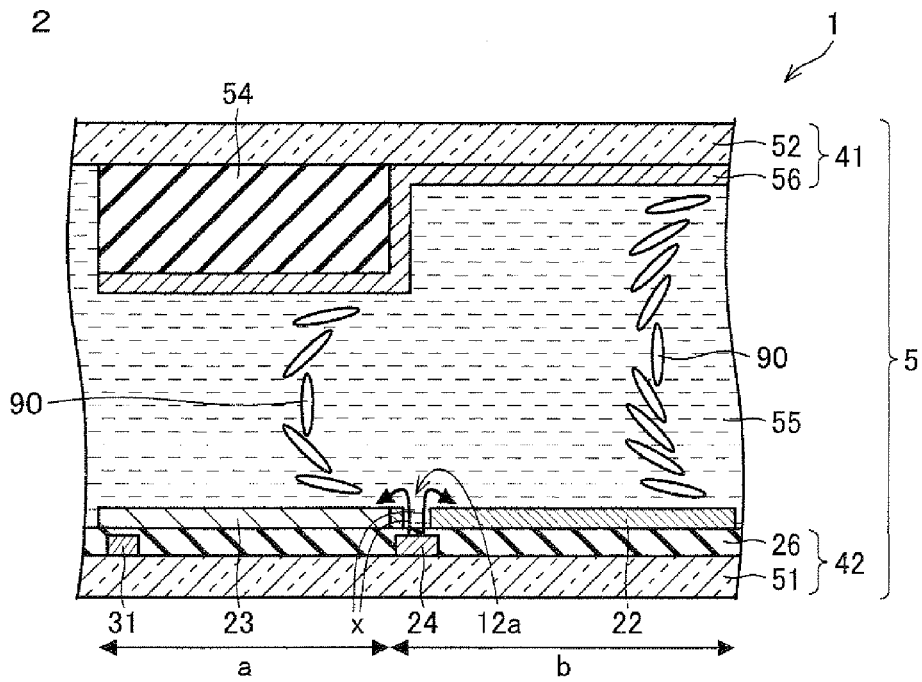
FIG. 2 is a cross-sectional view, taken on line A-A of FIG. 1, schematically illustrating an arrangement of a liquid crystal panel of the liquid crystal display device of the embodiment of the present invention.

Next, the following description deals in more detail with how the color filter substrate 41 and the TFT substrate 42 are arranged in the liquid crystal display device 1, with reference to FIGS. 1 and 2.

FIG. 1 is a plan view schematically illustrating an arrangement of one pixel of the TFT substrate 42. As shown in FIG. 1, each pixel 11 includes a pixel electrode 21, a gate bus line 31 and a data bus line 32 formed around the pixel electrode 21 so as to cross each other via an insulating layer (not shown), and a TFT (Thin Film Transistor) 33. The pixel electrode 21 is comprised of a second transparent electrode 22 and a reflective electrode 23. The reflective electrode 23 and a drain electrode 33d of the TFT electrode 33 are connected to each other via a contact hole 15.

A common electrode 24, serving as an auxiliary capacity electrode, is formed in the vicinity of a border between the second transparent electrode 22 and the reflective electrode 23 (i.e. the vicinity of the center of the pixel electrode 21) so as to be formed in parallel to the gate bus line 31 and so that the common electrode 24 and the gate bus line 31 constitute a single layer.

An intermediate electrode 25 is formed in a region where the common electrode 24 and the second transparent electrode overlap each other such that the intermediate electrode 25 and the data bus line 32 constitute a single layer. The intermediate electrode 25 and the pixel electrode 21 are electrically connected to each other via the contact hole 15.

This arrangement causes a formation of an auxiliary capacity for stabilizing an electric potential of the pixel electrode 21 between the intermediate electrode 25 and the common electrode 24.

Further, each of the data bus line 32, the gate bus line 31 and the common electrode 24 is connected to a driving circuit, and has means via which any electric potential can be supplied independently.

Further, a slit 12a serving as a nucleus generation section, that is, a cutout is formed on the region of the transparent electrode 22 where the second transparent electrode 22 and the common electrode 24 overlap each other. Here, the nucleus generation section is a section for generating a nucleus for a bend alignment (bend nucleus) which nucleus causes an alignment of the liquid crystal molecules in the OCB mode to shift from a spray alignment to a bend alignment.

The slit 12a is formed in the second transparent electrode 22 in the vicinity of the border between the second transparent electrode 22 and the reflective electrode 23. FIG. 1 shows an example of the slit 12a having a rectangular shape. However, the slit 12a can have another shape such as square.

In a case where the common electrode 24 is provided below the slit 12a in the second transparent electrode 22 as described above, a difference in potential is caused between the second transparent electrode 22 and the common electrode 24. The difference in potential causes a lateral electric field to be generated in the vicinity of the slit 12a, thereby forming the nucleus for the bend transition.

FIG. 2 is a cross-sectional view, taken on line A-A of FIG. 1, schematically illustrating an arrangement of the liquid crystal panel 5 in the liquid crystal display device 1 of the present embodiment. FIG. 2 shows a cross-sectional arrangement of the liquid crystal panel 5 and an alignment state of liquid crystal molecules 90 in the liquid crystal layer 55. In FIG. 2, x indicates an equipotential line.

As described above, the color filter substrate 41 includes the step resin layer 54 which is a step for causing the liquid crystal layer 55 in the reflective area a to be thinner than that in the transmissive area b. As described above, the height of the step resin layer 54 is substantially half the distance between the first glass substrate 52 and the second glass substrate 51.

A surface of the step resin layer 54 which surface is parallel to the first glass substrate 52 has substantially the same shape as an opposing surface of the reflective electrode 23.

Further, the surface of the step resin layer 54 which is parallel to the first glass substrate 52 and its orthogonal surface cross each other at substantially a right angle. More specifically, each end surface of the step resin layer 54 has a rectangular shape.

Further, as described above, the slit 12a is formed in the second transparent electrode 22, and an insulating layer 26 is formed between the second transparent electrode 22 and the common electrode 24.

As shown in FIG. 2, the equipotential line x around the slit 12a curves, so that the electric field has a component parallel to the second glass electrode 51. The lateral electric field, which is the electric field parallel to the second glass electrode 51, forms a nucleus from which a transition of the liquid crystal molecules 90 from the spray alignment to the bend alignment starts.

The transition to the bend alignment spreads from the nucleus throughout the pixel 11. Due to the step resin layer 54, there is a difference in thickness of the liquid crystal layer 55 between the reflective area a and the transmissive area b. However, the inventors of the present invention found out that the bend alignment spreads beyond a step of the step resin layer 54 in a case where the nucleus was formed sufficiently close to the border.

The present embodiment discusses an example in which a distance between the step resin layer 54 and the slit 12a was set to 5 micron. The bend alignment was propagated from the transmissive area b to the reflective area a, almost without being affected by the thickness difference generated by the step resin layer 54. On the other hand, in a case where the distance was set to not less than 20 micron, it was observed that the propagation of the bend alignment sometimes stopped.

Further, in the present embodiment, a projection 12b can be used as the nucleus generation section instead of the slit 12a.

Figure 4:
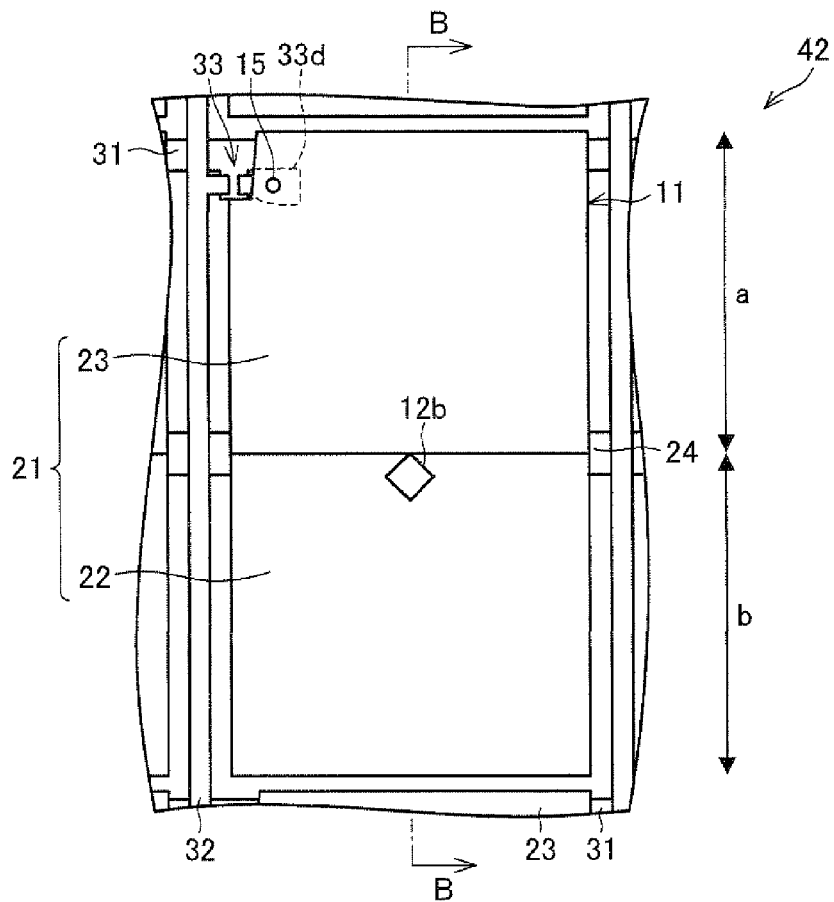
FIG. 4 is a plan view schematically illustrating an arrangement of one pixel of a TFT substrate in a liquid crystal display device of the embodiment of the present invention.
Figure 5:
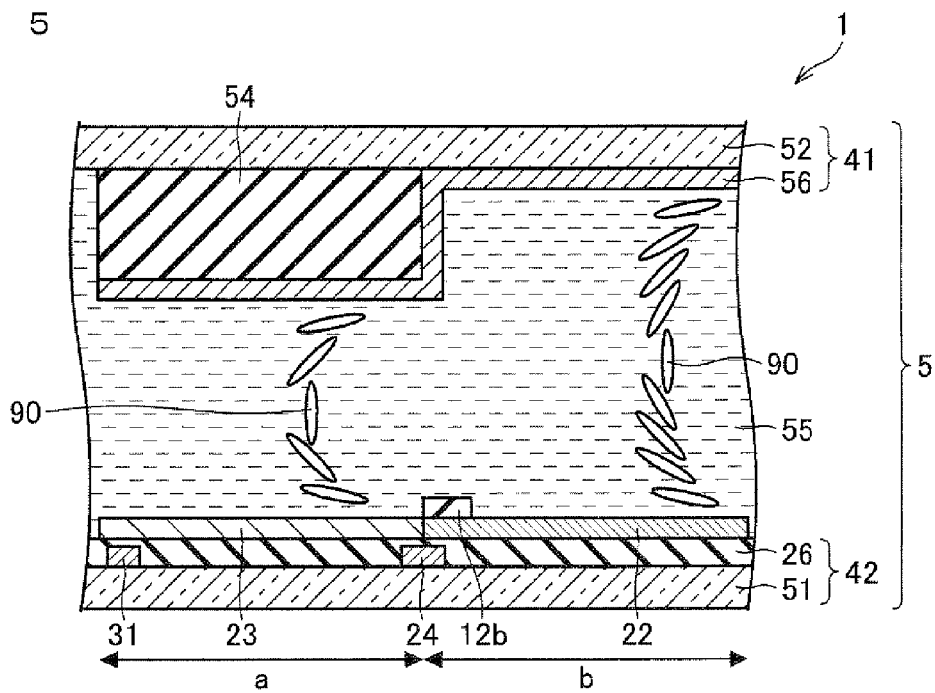
FIG. 5 is a cross-sectional view, taken on line B-B of FIG. 4, schematically illustrating an arrangement of a liquid crystal panel of the liquid crystal display device of the embodiment of the present invention.

FIG. 4 is a plan view schematically illustrating an arrangement of one pixel 11 of a TFT substrate in another liquid crystal display device 1 of the present embodiment in which the projection 12b is used as the nucleus generation section. Further, FIG. 5 is a cross-sectional view, taken on line B-B of FIG. 4, schematically illustrating an arrangement of a liquid crystal panel 5 in the liquid crystal display device 1 of the present embodiment. FIG. 5 shows a cross-sectional arrangement of the liquid crystal display device 1 shown in FIG. 4 and an alignment state of the liquid crystal molecules 90.

As shown in FIGS. 4 and 5, this liquid crystal display device 1 is different from that shown in FIGS. 1 and 2 only in that the projection 12b is used as the nucleus generation section instead of the slit 12a shown in FIGS. 1 and 2. In the present embodiment, the projection 12b having a rectangular parallelepiped shape is provided in a TFT substrate 42. More specifically, the projection 12b is provided on the second transparent electrode 22 in the TFT substrate 42, and is formed in the vicinity of a border line between the second transparent electrode 22 and a reflective electrode 23.

In the liquid crystal display device 1, a bend alignment spreads from a nucleus for a bend alignment which nucleus generated by the projection 12b serving as the nucleus generation section. Also in the liquid crystal display device 1 shown in FIGS. 4 and 5, there is a difference in thickness of the liquid crystal layer 55 between the reflective area a and the transmissive area b due to the step resin layer 54. However, the bend alignment spreads beyond the step of the step resin layer 54 in a case where a nucleus for a bend alignment which nucleus generated by the projection 12b serving as the nucleus generation section is formed sufficiently close to the border.

Also in the liquid crystal display device 1 shown in FIGS. 4 and 5, the bend alignment is propagated almost without being affected by the step in a case where a distance between the step resin layer 54 and the projection 12b is set to 5 micron, whereas propagation of the bend alignment stops at the step in a case where the distance between the step resin layer 54 and the projection 12b is set to 20 micron.

Further, the present embodiment discusses an example in which the projection 12b has a rectangular parallelepiped shape. However, the shape of the projection 12b is not limited to this. Alternatively, the projection 12b can have another shape such as a trapezoid.

In a case where the projection 12b is used as the nucleus generation section as described above, the projection 12b does not utilize the difference in potential between the common electrode 24 and the pixel electrode while a nucleus is generated, unlike the slit 12a. Therefore, it is not always necessary that the projection 12b be provided in a region where the projection 12b and the common electrode 24 overlap each other, provided that the projection 12b is formed in the vicinity of the border between the reflective area a and the transmissive area b.

Further, in the liquid crystal display device 1 shown in FIGS. 1 and 2, the slit 12a is formed in the region where the second transparent electrode 22 and the common electrode 24 overlap each other. However, the present embodiment is not limited to this. In a case where a slit (opening in an electrode) is used as the nucleus generation section as described above, it is only necessary that the nucleus generation section includes two layers of electrodes that are provided on different planes between which an insulating layer is sandwiched; one of the electrodes which is closer to the liquid crystal layer 55 has a slit in part of a region where the two electrodes overlap each other via the insulating layer; and there is a difference in potential between the two electrodes.

Embodiment 2

Embodiment 2 of the present invention is described below with reference to FIGS. 6 through 12. The present embodiment mainly deals with how Embodiment 2 differs from the Embodiment 1. For convenience of explanation, constituents which have similar functions to those explained in the Embodiment 1 are given identical reference numerals, and are not explained repeatedly.

The present embodiment is characterized in that the border line between a second transparent electrode 22 and a reflective electrode 23 is not a straight line. More specifically, the border line between the second transparent electrode 22 and the reflective electrode 23 has a bent section (step section, concavity and convexity), and one of the second transparent electrode 22 and the reflective electrode 23 has an area partially surrounded by the other one of the electrodes.

(a) of FIG. 6, (a) of FIG. 7 and (a) of FIG. 8 are plan views each schematically illustrating an arrangement of a pixel 11 in a TFT substrate 42 of the liquid crystal display device 1 of the present embodiment. Each of (b) of FIG. 6, (b) of FIG. 7 and (b) of FIG. 8 is a view illustrating an end surface of the reflective electrode 23 corresponding to a border line between the second transparent electrode 22 and the reflective electrode 23 in the TFT substrate 42 shown in respective one of (a) of FIG. 6, (a) of FIG. 7 and (a) of FIG. 8.

As shown in FIGS. 6 through 8, each pixel 11 is arranged such that the border line between the second transparent electrode 22 and the reflective electrode 23 is not a straight line, but has a step (h shown in (a) of FIG. 6, (a) of FIG. 7 and (a) of FIG. 8) in plan view. The step has, for example, a rectangular shape as shown in (a) of FIG. 6, a trapezoidal shape having only obtuse angles as shown in (a) of FIG. 7, and a trapezoidal shape having acute angles as shown in (a) of FIG. 8. As shown in (b) of FIG. 6, (b) of FIG. 7 and (b) of FIG. 8, each of the end surfaces of the second transparent electrodes 22 and the reflective electrodes 23 has a rectangular shape.

Further, the liquid crystal display device 1 of the present embodiment is arranged such that the slit 12a serving as the nucleus generation section is not formed in the vicinity of the border between the second transparent electrode 22 and the reflective electrode 23, but is formed near the center of the reflective electrode 23. More specifically, the slit 12a is formed near the center where the reflective electrode 23 and the common electrode 24 formed parallel to the gate bus line 31 overlap each other. Note that no intermediate electrode is formed in the present embodiment.

FIG. 9 is a cross-sectional view, taken on line C-C of (a) of FIG. 6, schematically illustrating an arrangement of the liquid crystal panel 5 in the liquid crystal display device 1 of the present embodiment. FIG. 9 shows a cross-sectional arrangement of the liquid crystal panel 5 and an alignment state of the liquid crystal molecules 90. As shown in FIG. 9, like the embodiment 1, the liquid crystal display device 1 of the present embodiment is arranged such that a step resin layer 54 is formed in a reflective area a of a color filter substrate 41, more specifically, in a region corresponding to the reflective electrode 23. Also in the present embodiment, the step resin layer 54 has a surface which is parallel to the first glass substrate 52 and is in substantially the same shape as an opposing surface of the reflective electrode 23. That is, the step resin layer 54 has a surface parallel to the first glass substrate 52 and is in substantially the same shape as the surface of the reflective electrode 23 whose border line with the second transparent electrode 22 has a rectangular shape (see (a) of FIG. 6).

As discussed in the Embodiment 1, the inventors of the present invention found out that (i) the bend alignment sometimes stopped propagation at the border between the second transparent electrode 22 and the reflective electrode 23 and therefore was not propagated beyond the border, in a case where (a) the pixel electrode 21 was divided into the reflective area a and the transmissive area b by a straight line so that the straight line came across the pixel electrode 21 and (b) the slit 12a was provided away from the border, whereas, (ii) the bend alignment was easily propagated beyond the border, that is, beyond the step of the step resin layer 54, regardless of whether the slit 12a was provided in the vicinity of the border between the second transparent electrode 22 and the reflective electrode 23 (see FIGS. 6 through 8, in a case where the border line was not defined by a straight line, for example, the border line was defined by a plurality of bent straight lines or by a curved line.

Therefore, the present embodiment is not necessarily limited to a case where the slit 12a is formed in the vicinity of the border between the reflective area a and the transmissive area b. In the present embodiment, the common electrode 24 is formed so as to be away from the border between the reflective area a and the transmissive area b. This causes the slit 12a to be formed so as to be away from the border between the reflective area a and the transmissive area b.

The following description deals with how the liquid crystal display device 1 of the present embodiment operates.

For example, with the arrangement shown in FIG. 6, the border line has a rectangular shape, and the nucleus generation section is formed in the reflective area a. In this case, a nucleus for the bend alignment is formed by the nucleus generation section, and then the bend alignment thus generated is propagated throughout the reflective area a. The propagation of the bend alignment stops once at the border between the reflective area a and the transmissive area b. This is because the thickness of the liquid crystal layer 55 changes at the border.

However, a situation occurs in which a spray alignment area is partially sandwiched between bend alignment areas in the vicinity of the border line, because (i) the border line between the second transparent electrode 22 and the reflective electrode 23 has a bent section (step h) and (ii) the bent section (step h) is formed so as to have a rectangular end surface (see FIGS. 6 through 8).

In a case where the border between the reflective area a and the transmissive area b has a rectangular shape, a border between the bend alignment and the spray alignment takes a rectangular shape along the step h when the bend alignment is propagated toward one side of the step h. This causes the spray alignment to be partially surrounded by the bend alignment. At a surface of the border, the border tries to become as short as possible due to a surface tension. This causes a rectangular-shaped part to try to become a straight line, and the spray alignment ultimately climbs over the step h. This causes a transition of the spray alignment area which was surrounded by the bend alignment into the bend alignment. This triggers the propagation of the bend alignment throughout the pixel 11.

In (a) of FIG. 6, (i) the border line between the second transparent electrode 22 and the reflective electrode 23, and (ii) the corresponding step resin layer 54 have a rectangular shape. Note that the shape is not limited to a perfect rectangular, provided that a situation can be realized in which the spray alignment area is surrounded by the bend alignment area. For example, a similar effect can be also obtained by the shapes shown in (a) of FIG. 7 and (a) of FIG. 8.

The border line shown in (a) of FIG. 7 has a shape having only obtuse angles in plan view. Therefore, the border shown in (a) of FIG. 7 has the advantage of easy manufacturing, whereas has the disadvantage of lower ability to expand the bend alignment due to the surface tension than the border line which has a rectangular shape of two dimensions ((a) of FIG. 6).

The border line shown in (a) of FIG. 8 has the advantage of higher ability to expand the bend alignment due to the surface tension than the border having a rectangular shape shown in (a) of FIG. 6, whereas has the disadvantage of difficult manufacturing because the border line has acute angles.

Further, in (a) of FIG. 6, (a) of FIG. 7 and (a) of FIG. 8, the border line is arranged such that the reflective area a has three convex sections, and the transmissive area b has two concave sections. This causes two spray alignment areas to be surrounded by the bend alignment. As such, the expansion of the bend alignment is more surely carried out than a case in which only one spray alignment area is surrounded. Further, the expansion of the bend alignment is more surely carried out because (i) a curvature radius of the border line becomes smaller and (ii) it becomes difficult to maintain coexistence of the spray alignment and the bend alignment at the border line.

Note that the number of the convex sections of the border line is not limited to the embodiment. This is because a transition to the bend alignment is promoted as long as at least one spray alignment area is surrounded in a concave manner by the bend alignment areas.

Further, the types of the border line are not limited to those explained in the embodiment. For example, the border line can have a wave-like shape shown in (a) of FIG. 10, a sawtooth shape made of a series of triangles as shown in (b) of FIG. 10, or other curved shape. It is believed that this is because of the following reason. Namely, the present embodiment, as described above, utilizes the fact that the length of the border line between the spray alignment and the bend alignment to try to become minimum, and on this account the fact can be used as long as the border has some kind of concavity and convexity shape. As described above, it is preferable that the coverture radius of the convex and concave section is small so that it becomes difficult to maintain coexistence of the spray alignment and the bend alignment at the border line. Here, (a) of FIG. 10 and (b) of FIG. 10 are views each showing the border between the reflective electrode 23 and the second transparent electrode 22 in the present embodiment.

Further, in the present embodiment, the nucleus generation section is formed in the reflective area a. With the arrangement, formation of the nucleus generation section does not cause deterioration in display efficiency of the transmissive area b. Therefore, this arrangement is advantageous to a case where a greater importance is given to transmissive display than to reflective display.

Further, in the liquid crystal display device shown in any one of FIGS. 6 through 8, 9 and 10, it is unnecessary to form, for example, the common electrode 124 shown in FIG. 31 in the transmissive area b. This allows an improvement in transmittance in the transmissive area b.

According to the present embodiment, the slit 12a is used as the nucleus generation section in the liquid crystal display device 1 shown in any one of FIGS. 6 through 10. However, the present embodiment is not limited to this. In the present Embodiment 2, the projection 12b can be used as the nucleus generation section instead of the slit 12a as in the Embodiment 1.

FIG. 11 is a plan view showing an arrangement of the pixel 11 of another liquid crystal display device 1 of the present embodiment in which the projection 12b is used as the nucleus generation section. FIG. 12 is a cross-sectional view, taken on line D-D of FIG. 11, schematically illustrating an arrangement of the liquid crystal panel 5 in the liquid crystal display device 1 of the present embodiment. FIG. 12 shows a cross-sectional arrangement of the liquid crystal display device 1 shown in FIG. 11 and an alignment state of the liquid crystal molecules 90.

As shown in FIGS. 11 and 12, the liquid crystal display device 1 is different from that shown in FIGS. 6 and 9 only in that the projection 12b is used as the nucleus generation section instead of the slit 12a shown in FIGS. 6 and 9. In the present embodiment, the projection 12b serving as the nucleus generation section is provided on the TFT substrate 42, and has a rectangular parallelepiped shape as in the liquid crystal display device 1 shown in FIGS. 12 and 13 in the Embodiment 1. More specifically, the projection 12b is provided in the vicinity of the center of the reflective electrode 23 of the TFT substrate 42.

Note also in the present embodiment that the shape of the projection 12b is not limited to the rectangular parallelepiped shape. For example, the projection 12b may have another shape such as a trapezoidal shape.

Further, the present embodiment is not limited to a case where the projection 12b is provided in a region where the projection 12b and the common electrode 24 overlap each other. Further, the present embodiment is not limited to a case where the projection 12b is provided in the vicinity of the border between the reflective area a and the transmissive area b. In the present embodiment, the common electrode 24 is formed in the vicinity of the border line between the second transparent electrode 22 and the reflective electrode 23, and does not overlap with the nucleus generation section.

As shown in FIG. 12, in the present embodiment, a nucleus for the bend alignment is formed by the projection 12b in the reflective area a, more specifically, near the center (in the vicinity of the center) of the reflective area a (reflective electrode 23). As in the liquid crystal display device 1 shown in FIGS. 6 through 10, surface tension of the border between the spray alignment area and the bend alignment area is generated at the border between the second transparent electrode 22 and the reflective electrode 23. The surface tension causes the bend alignment to be propagated to the transmissive area b. More specifically, the liquid crystal display device 1 of the present embodiment is arranged such that (i) the border line between the second transparent electrode 22 and the reflective electrode 23 and (ii) the corresponding step resin layer 54 have rectangular shape. Therefore, the bend alignment generated in the reflective area a is propagated beyond the step provided between the reflective area a and the transmissive area b and is propagated to the transmissive area b.

The present embodiment has discussed an example in which the nucleus generation section is formed near the center of the reflective area a, more specifically, in an area of the reflective area a which faces the convex section of the border line. However, the present embodiment is not limited to the case where the nucleus generation section is provided in the above area. As described above, in a case where the nucleus generation section is provided in the area which faces the convex section of the border line, a situation can be more easily realized in which non-bend-alignment area is partially surrounded by the bend alignment area. However, as described above, according to the present embodiment, the force causing the length of the border line to be short is generated, and due to the force, the bend alignment is propagated beyond the border. Therefore, the present embodiment is not limited to the case where the nucleus generation section is provided in the vicinity of the border, unlike the Embodiment 1. It is possible to freely select a region where the nucleus generation section is provided. That is, in a case where a nucleus generation section is provided in the reflective area a, the nucleus generation section can be formed in any region in the reflective area a.

Embodiment 3

Embodiment 3 of the present invention is described below with reference to FIGS. 13 and 14. The present embodiment mainly deals with how the Embodiment 3 is different from the Embodiments 1 and 2. For convenience of explanation, constituents which have similar functions to those explained in the Embodiments 1 and 2 are given identical reference numerals, and are not explained repeatedly.

A feature of the present embodiment resides in that a slit 12a serving as the nucleus generation section is formed in a second transparent electrode 22, unlike the Embodiment 2. Other constituents are similar to those in the Embodiment 2.

(a) of FIG. 13 is a plan view schematically illustrating an arrangement of a pixel 11 of a TFT substrate 42 in a liquid crystal display device 1 of the present embodiment in which a nucleus generation section is provided on a second transparent electrode 22. Further, (b) of FIG. 13 is a view showing an end surface of a reflective electrode 23 corresponding to the border line between the second transparent electrode 22 and the reflective electrode 23 in the TFT substrate 42 shown in (a) of FIG. 13. FIG. 14 is a cross-sectional view, taken on line E-E of (a) of FIG. 13, schematically illustrating an arrangement of the liquid crystal panel 5 in the liquid crystal display device 1 of the present embodiment. FIG. 14 shows a cross-sectional arrangement of the liquid crystal panel 5 and an alignment state of the liquid crystal molecules 90.

As shown in (a) of FIG. 13, the slit 12a serving as the nucleus generation section is formed near the center of the second transparent electrode 22. More specifically, the slit 12a is formed near the center where the second transparent electrode 22 and the common electrode 24 formed parallel to the gate bus line 31 overlap each other.

The following description deals with how the liquid crystal display device 1 of the present embodiment operates.

As shown in FIGS. 13 and 14, in the present embodiment, a nucleus for the bend alignment is formed in the transmissive area b by the slit 12a, and the bend alignment spreads throughout the transmissive area b. Like the Embodiment 2, the bend alignment is propagated beyond the border between the transmissive area b and the reflective area a due to surface tension of the border, and is propagated to the reflective area a.

The arrangement of the present embodiment is advantageous to a case where the reflective area a is smaller than the transmissive area b in each pixel 11 as shown in FIG. 13. This is because, when the nucleus generation section is formed in the transmissive area b which is larger than the reflective area a, it is possible to increase a distance between the common electrode 24 and the gate bus line 31 so that an electrical short of the common electrode 24 and the gate bus line 31 can be prevented.

Further, in the present embodiment, a projection 12b may be used as the nucleus generation section instead of the slit 12a.

FIG. 15 is a plan view schematically illustrating an arrangement of a pixel 11 of a liquid crystal display device 1 of the present embodiment. FIG. 16 is a cross-sectional view, taken on line F-F of FIG. 15, schematically illustrating an arrangement of a liquid crystal panel 5 in the liquid crystal display device 1 of the present embodiment. FIG. 16 shows a cross-sectional arrangement of the liquid crystal panel 5 and an alignment state of the liquid crystal molecules 90. In FIGS. 15 and 16, an area a indicates a reflective area, and an area b indicates a transmissive area.

As shown in FIGS. 15 and 16, in the present embodiment, the projection 12b serving as the nucleus generation section is formed on the second transparent electrode 22 provided on the second glass substrate 51.

The liquid crystal display device 1 of the present embodiment is arranged such that (i) the border line between the second transparent electrode 22 and the reflective electrode 23 and (ii) the corresponding step resin layer 54 have a rectangular shape. Therefore, the bend alignment generated in the transmissive area b by the projection 12b is propagated to the reflective area a although the step resin layer 54 causes a difference in thickness of the liquid crystal layer 55.

The present embodiment has discussed an example in which the nucleus generation section is formed near the center of the transmissive area b. However, the present embodiment is not limited to a case where the nucleus generation section is formed near the center of the transmissive area b. In a case where the nucleus generation section is provided in the transmissive area b, the nucleus generation section may be provided in any region in the transmissive area b.

Embodiment 4

Embodiment 4 of the present invention is described below with reference to FIGS. 17 and 18. The present embodiment mainly deals with how the Embodiment 4 differs from the above embodiments. For convenience of explanation, constituents which have similar functions to those explained in the above embodiments are given identical reference numerals, and are not explained repeatedly.

A feature of the present embodiment resides in that the border line between a second transparent electrode 22 and a reflective electrode 23 has a rectangular shape, and in that the nucleus generation section is formed in a convex section of the second transparent electrode 22. In other words, the nucleus generation section is formed in an area of the second transparent electrode 22 which is sandwiched between two neighboring convex sections of the reflective electrode 23.

FIG. 17 is a plan view schematically illustrating an arrangement of a pixel 11 of a liquid crystal display device 1 of the present embodiment. FIG. 18 is a cross-sectional view, taken on line G-G of FIG. 17, schematically illustrating an arrangement of a liquid crystal panel 5 in the liquid crystal display device 1 of the present embodiment. FIG. 18 shows a cross-sectional arrangement of the liquid crystal panel 5 and an alignment state of the liquid crystal molecules 90.

As shown in FIGS. 17 and 18, in the present embodiment, the border line between the second transparent electrode 22 and the reflective electrode 23 has a rectangular shape, and a slit 12a serving as the nucleus generation section is formed in a convex section of the second transparent electrode 22 at the border having a rectangular shape, in which convex section the second transparent electrode 22 and the common electrode 24 overlap each other.

The following description deals with how the liquid crystal display device 1 of the present embodiment operates.

As shown in FIGS. 17 and 18, in the present embodiment, a nucleus for a bend alignment is formed in a transmissive area b at a border section (in the vicinity of the border, specifically, within a step) between a reflective area a and the transmissive area b. Although the step resin layer 54 generates a difference in thickness of the liquid crystal layer 55, the bend alignment is also propagated to the reflective area a due to surface tension of the border in a similar manner as described in the Embodiment 2. In the arrangement of the present embodiment, (i) the border line between the second transparent electrode 22 and the reflective electrode 23, and (ii) the corresponding step resin layer 54 have a rectangular shape. This allows the bend alignment to spread more easily. Therefore, the nucleus generation section can be provided in any region in the pixel 11. This offers greater flexibility in designing the liquid crystal display device 1. Therefore, as shown in FIGS. 17 and 18, it is also possible to form the slit 12a in the border section.

Further, in the present embodiment, a projection 12b can be used as the nucleus generation section instead of the slit 12a.

FIG. 19 is a plan view schematically illustrating an arrangement of a pixel 11 of a liquid crystal display device 1 of the present embodiment. FIG. 20 is a cross-sectional view, taken on line H-H of FIG. 19, schematically illustrating an arrangement of a liquid crystal panel 5 in the liquid crystal display device 1 of the present embodiment. FIG. 20 shows a cross-sectional arrangement of the liquid crystal panel 5 and an alignment state of the liquid crystal molecules 90. In FIGS. 19 and 20, the area a indicates a reflective area, and the area b indicates a transmissive area.

As shown in FIGS. 19 and 20, in the present embodiment, the border line between the second transparent electrode 22 and the reflective electrode 23 has a rectangular shape, and the projection 12b serving as the nucleus generation section is formed in the convex section of the reflective electrode 23 at the border having a rectangular shape. In the present embodiment, a nucleus for the bend alignment is formed in the transmissive area b in the vicinity of the border between the reflective area a and the transmissive area b. The bend alignment is propagated due to surface tension of the border in a similar manner as described in the Embodiment 2.

Embodiment 5

Embodiment 5 of the present invention is described below with reference to FIGS. 21 and 22. The present embodiment mainly deals with how the Embodiment 5 differs from the above Embodiments. For convenience of explanation, constituents which have similar functions to those explained in the above Embodiments are given identical reference numerals, and are not explained repeatedly.

A feature of the present embodiment resides in that a slit 12a serving as the nucleus generation section is not formed in a TFT substrate 42, but formed in the color filter substrate 41.

FIGS. 21 and 22 are cross-sectional views each schematically illustrating an arrangement of a liquid crystal panel 5 in a liquid crystal display device 1 of the present embodiment. FIGS. 21 and 22 each shows a cross-sectional arrangement of the liquid crystal panel 5 and an alignment state of the liquid crystal molecules 90.

As shown in FIG. 21, the liquid crystal display device 1 of the present embodiment is arranged such that the slit 12a is formed in the first transparent electrode 56 in a transmissive area b. Further, as shown in FIG. 22, another liquid crystal display device of the present embodiment is arranged such that a slit 12a is formed in a first transparent electrode 56 in a reflective area a.

Specifically, the liquid crystal display device 1 shown in FIG. 21 is arranged such that an auxiliary electrode 28 is formed, on a surface of the first glass substrate 52 which surface faces the TFT substrate 42, specifically, so as to face the second transparent electrode 22 of the TFT substrate 42 (so as to be in the transmissive area b of the liquid crystal panel 5). The first transparent electrode 56 is formed on the auxiliary electrode 28 via an insulating layer 26. The slit 12a serving as the nucleus generation section, in other words, a cutout of the first transparent electrode 56 is formed in a region of the first transparent electrode 56 where the first transparent electrode 56 and the auxiliary electrode 28 overlap each other.

Further, the liquid crystal display device 1 shown in FIG. 22 is arranged such that an auxiliary electrode 28 is formed on a surface of a step resin layer 54 formed on a first glass substrate 52 which surface faces the TFT substrate 42. The first transparent electrode 56 is formed on the auxiliary electrode 28 via an insulating layer 26. A slit 12a serving as the nucleus generation section, in other words, a cutout of the first transparent electrode 56 is formed in a region of the first transparent electrode 56 where the first transparent electrode 56 and the auxiliary electrode 28 overlap each other.

In the above embodiment, the auxiliary electrode 28 and the first transparent electrode 56 constitute two layers of electrodes which are provided on different planes so that the insulating layer is sandwiched between the auxiliary electrode 28 and the first transparent electrode 56. Note that the common electrode 24 can be used instead of the auxiliary electrode 28, provided that there is a difference in potential (i) between the first transparent electrode 56 and the auxiliary electrode 28, or (ii) between the first transparent electrode 56 and the common electrode 24.

Further, in the present embodiment, the projection 12b can be used as the nucleus generation section instead of the slit 12a.

FIG. 23 is a cross-sectional view schematically illustrating an arrangement of a liquid crystal panel 5 in the liquid crystal display device 1 of the present embodiment. FIG. 23 shows a cross-sectional arrangement of the liquid crystal panel 5 and an alignment state of the liquid crystal molecules 90.

As shown in FIG. 23, another liquid crystal display device of the present embodiment is arranged such that a projection 12b is formed on a first transparent electrode 56 in a transmissive area b. In a case where the projection 12b is formed on a color filter substrate 41, it is further possible to form the projection 12b and the step resin layer 54 at the same time, unlike a case in which a projection 12b is formed on a TFT substrate 42. This makes it possible to form the projection 12b without increasing manufacturing steps.

Also in the present embodiment, the nucleus generation section may be formed in the reflective area a or in the transmissive area b. Further, the present embodiment is not limited to a case where the nucleus generation section is formed near the center of the areas. The nucleus generation section can be formed in any region.

The present invention is not limited to the description of the embodiments above, but may be altered by a skilled person within the scope of the claims. An embodiment based on a proper combination of technical means disclosed in different embodiments is encompassed in the technical scope of the present invention.

For example, the auxiliary capacity is applicable to any of the embodiments although it is not mandatory for the intermediate electrode 25 to form the auxiliary capacity.

Further, (i) the position and shape of the slit 12a and the projection 12b each serving as the nucleus generation section, (ii) the type of the border line between the second transparent electrode 22 and the reflective electrode 23, and (iii) a combination of the border line and the nucleus generation section are not limited to specific ones, respectively.

For example, the position in which the nucleus generation section is formed is not limited to one of the transmissive area b and the reflective area a. The nucleus generation section can be formed, so as to straddle the border between the transmissive area b and the reflective area a. FIGS. 24 through 27 are views each illustrating an example of this arrangement.

FIGS. 24 and 26 are plan views each schematically illustrating an arrangement of a pixel 11 of a liquid crystal display device 1 of the present invention. FIG. 25 is a cross-sectional view, taken on line I-I of FIG. 24, schematically illustrating an arrangement of a liquid crystal panel 5 in the liquid crystal display device 1 of the present embodiment. FIG. 27 is a cross-sectional view, taken on line J-J of FIG. 26, schematically illustrating an arrangement of a liquid crystal panel 5 in the liquid crystal display device 1 of the present embodiment. FIGS. 25 and 27 each shows a cross-sectional arrangement of the liquid crystal panel 5 and an alignment state of the liquid crystal molecules 90.

As shown in FIGS. 24 and 25, a liquid crystal display device of the present invention can be arranged such that the border line is a straight line, a slit 12a serving as the nucleus generation section is formed on a TFT substrate 42 so as to straddle the border between a reflective area a and a transmissive area b.

Further, as shown in FIGS. 26 and 27, a liquid crystal display device of the present invention can be arranged such that the border line is a straight line, a projection 12b serving as the nucleus generation section is formed on a TFT substrate 42 so as to straddle the border between a reflective area a and a transmissive area b.

The position in which the nucleus generation section is formed is not limited to a particular position in the pixel, especially in a case where the border line is not a straight line. The nucleus generation section can be formed, for example, in the vicinity of the center of a transmissive area or a reflective area, on the periphery of the transmissive area or the reflective area, in the vicinity of the border, or within a convex section of the border. Naturally, in a case where the border line has a step as shown in the Embodiments 2 through 4, the nucleus generation section can be formed so as to straddle the step. That is, the nucleus generation section can be formed in the step section (border section) so as to straddle the border between a reflective area a and a transmissive area b.

Further, an electrode formed below the slit 12a via the insulating layer 26 is not limited to the common electrode 24, and therefore can be another electrode such as a gate bus line 31 or a data bus line 32.

Further, in a case where a single nucleus generation section is formed in a single pixel, the number of nucleus for the bend transition, that is, the number of nucleus generated by the nucleus generation section is not limited to one.

Further, in the present embodiment, (i) a step resin layer and the like are provided on a first substrate on a display surface side; (ii) a reflective display section having reflective means and a transmissive display section having no reflective means are provided on a second substrate opposite to the first substrate; and (iii) a reflective pixel electrode of the reflective display section also serves as the reflective means. However, the present invention is not limited to this. The reflective means can be provided separately from the reflective pixel electrode. Alternatively, it is possible to arrange a reflective display section so that as shown in FIG. 30, a step resin layer and a reflective electrode are provided on a substrate opposite to a substrate on a display side. Note however that in a case where (i) the nucleus generation section which is a slit as shown in FIG. 24 is formed on a substrate on which the step resin layer is formed, it is likely that an effect of generating a nucleus in a reflective area is made smaller due to the step resin layer, as compared with a case in which the nucleus generation section is formed on a substrate on which the step resin layer is not formed. Further, in a case where the nucleus generation section which is a projection as shown in FIG. 26 is formed on the substrate on which the step resin layer is not formed, it is not likely that the projection is buried in the resin. This makes it possible to avoid the possibility that an effect which the projection should have inherently (effect of generating a nucleus) is made smaller due to the fact that the projection is buried in the resin. Therefore, although the nucleus generation section can be formed on any of the above substrates, it is preferable that the nucleus generation section is formed on a substrate on which no step resin layer is formed.

A liquid crystal display device of the present invention may be arranged such that the liquid crystal display device includes first and second substrates disposed oppositely to each other, liquid crystal sandwiched between the first and second substrates, the liquid crystal being in a spray alignment state under no applied voltage and being shifted into the bend alignment state in a case where an image is displayed, a gate bus line formed on the first substrate, a data bus line formed substantially vertically to the gate bus line, a transparent pixel electrode and a reflective pixel electrode formed in an area surrounded by the gate bus line and the data bus line, the liquid crystal layer on the reflective pixel electrode being thinner than that on the transmissive pixel electrode, wherein only one mechanism for transition to a bend alignment is provided on the pixel electrode.

As described above, the liquid crystal display device of the present invention is arranged such that only one nucleus generation section for generating a bend nucleus for promoting a transition of liquid crystal molecules of the liquid crystal layer into a bend alignment is provided in each pixel; and application of a voltage to the liquid crystal molecules of the liquid crystal layer in the transmissive area and the reflective area carries out a transition from a spray alignment into a bend alignment in response to an applied voltage. This makes it possible to provide a transflective type LCD device in which each of a transmissive area and a reflective area can be driven in an OCB mode, and it is possible to prevent a pixel from darkening in a case where each of the areas is driven in an OCB mode.

INDUSTRIAL APPLICABILITY

A liquid crystal display device of the present invention is a transflective type LCD device having a high response speed, high transmittance and high reflectance. Therefore, the liquid crystal display device of the present invention can be applied to (i) an image display device such as a television or a monitor, (ii) an image display device, such as a video camera, a digital camera, or a portable phone, for use in a personal digital assistant which displays a moving image and (iii) OA equipment such as a word processor or a personal computer.

The invention claimed is:
1. A liquid crystal display device comprising: a pair of opposing substrates, and a liquid crystal layer held by the pair of substrates, each pixel including a transmissive area and a reflective area, the liquid crystal layer being thinner in the reflective area than in the transmissive area, only a single nucleus generation section for generating a bend nucleus being provided in said each pixel, the bend nucleus promoting a transition of liquid crystal molecules of the liquid crystal layer into a bend alignment; and application of a voltage to the liquid crystal molecules of the liquid crystal layer in the transmissive area and the reflective area carrying out a transition from a spray alignment into a bend alignment in response to an applied voltage.

2. The liquid crystal display device according to claim 1, wherein:
the nucleus generation section is provided in a vicinity of a border between the reflective area and the transmissive area in said each pixel.

3. The liquid crystal display device according to claim 2, wherein:
the nucleus generation section is provided so as to straddle the border between the reflective area and the transmissive area.

4. The liquid crystal display device according to claim 1, wherein:
the border line between the reflective area and the transmissive area in said each pixel has a concavity and convexity shape of two dimensions so that one of the reflective area and the transmissive area is partially surrounded by the other one of the reflective area and the transmissive area.

5. The liquid crystal display device according to claim 4, wherein:
the nucleus generation section is provided in the reflective area.

6. The liquid crystal display device according to claim 4, wherein:
the nucleus generation section is provided in the transmissive area.

7. The liquid crystal display device according to claim 4, wherein:
the nucleus generation section includes two layers of electrodes provided in different planes, an insulating layer being sandwiched between the two layers of electrodes;
the nucleus generation section is an opening section provided in a part of an area in which one of the two layers of electrodes on a liquid crystal layer side and the other one of the two layers of electrodes overlap each other via the insulating layer; and
the two layers of electrodes are different in potential.

8. The liquid crystal display device according to claim 7, wherein:
said one of the two layers of electrodes on the liquid crystal layer side is a pixel electrode.

9. The liquid crystal display device according to claim 7, wherein:
said one of the two layers of electrodes on the liquid crystal layer side is a counter electrode.

10. The liquid crystal display device according to claim 4, wherein:
the nucleus generation section is a projection formed on a surface of one of the pair of substrates, the surface facing the liquid crystal layer.

11. The liquid crystal display device according to claim 10, wherein:
the projection is formed on a pixel electrode provided on the substrate.

12. The liquid crystal display device according to claim 10, wherein:
the projection is formed on a counter electrode provided on the substrate.

13. The liquid crystal display device according to claim 1, wherein:
the nucleus generation section includes two layers of electrodes provided in different planes, an insulating layer being sandwiched between the two layers of electrodes;
the nucleus generation section is an opening section provided in a part of an area in which one of the two layers of electrodes on a liquid crystal layer side and the other one of the two layers of electrodes overlap each other via the insulating layer; and
the two layers of electrodes are different in potential.

14. The liquid crystal display device according to claim 13, wherein:
said one of the two layers of electrodes on the liquid crystal layer side is a pixel electrode.

15. The liquid crystal display device according to claim 13, wherein:
said one of the two layers of electrodes on the liquid crystal layer side is a counter electrode.

16. The liquid crystal display device according claim 1, wherein:
the nucleus generation section is a projection formed on a surface of one of the pair of substrates, the surface facing the liquid crystal layer.

17. The liquid crystal display device according to claim 16, wherein:
the projection is formed on a pixel electrode provided on the substrate.

18. The liquid crystal display device according to claim 16, wherein:
the projection is formed on a counter electrode provided on the substrate.

* * * * *